US007658781B1

(12) United States Patent
Waggoner et al.

(10) Patent No.: US 7,658,781 B1
(45) Date of Patent: *Feb. 9, 2010

(54) SILICON-CONTAINING COMPOSITE BODIES, AND METHODS FOR MAKING SAME

(76) Inventors: W. Michael Waggoner, 38 W. Kapak Dr., Newark, DE (US) 19702; Barry R Rossing, Ocean Pines, MD (US); Marlene Rossing, legal representative, 6 Bunker Ct., Ocean Pines, MD (US) 21811; Michael A Richmond, 114 Kenmark Rd., Newark, DE (US) 19711; Michael K Aghajanian, 31 Findail Dr., Newark, DE (US) 19711; Allyn L McCormick, 136 Buttonwood Dr., Lewes, DE (US) 19958

(*) Notice: Subject to any disclaimer, the term of this patent is extended or adjusted under 35 U.S.C. 154(b) by 373 days.

This patent is subject to a terminal disclaimer.

(21) Appl. No.: 11/185,075

(22) Filed: Jul. 19, 2005

Related U.S. Application Data

(60) Continuation-in-part of application No. 10/336,626, filed on Jan. 3, 2003, now Pat. No. 6,919,127, which is a division of application No. 09/621,562, filed on Jul. 21, 2000, now Pat. No. 6,503,572.

(60) Provisional application No. 60/145,299, filed on Jul. 23, 1999, provisional application No. 60/623,485, filed on Oct. 30, 2004.

(51) Int. Cl.
*C22C 29/00* (2006.01)
(52) U.S. Cl. ............................ 75/236; 75/232; 75/238; 428/539.5
(58) Field of Classification Search .................. 75/236, 75/238, 232; 264/635; 428/294, 4, 446, 428/449, 698, 539.5
See application file for complete search history.

(56) References Cited

U.S. PATENT DOCUMENTS

| 2,765,512 | A |  | 10/1956 | Nesbit |  |
|---|---|---|---|---|---|
| 2,869,215 | A |  | 1/1959 | Smith |  |
| 3,205,043 | A |  | 9/1965 | Taylor |  |
| 3,246,275 | A |  | 4/1966 | Schrewelius |  |
| 3,275,722 | A |  | 9/1966 | Popper |  |
| 3,495,939 | A |  | 2/1970 | Forrest |  |
| 3,725,015 | A |  | 4/1973 | Weaver |  |
| 4,148,894 | A |  | 4/1979 | Hillig et al. |  |
| 4,174,971 | A |  | 11/1979 | Schrewelius |  |
| 4,600,481 | A |  | 7/1986 | Sane et al. |  |
| 4,643,741 | A | * | 2/1987 | Yu et al. | 51/295 |
| 4,735,923 | A |  | 4/1988 | Sugarowa et al. |  |
| 5,006,417 | A |  | 4/1991 | Jackson |  |
| 5,079,195 | A |  | 1/1992 | Chaing et al. |  |
| 5,125,822 | A |  | 6/1992 | Kasprzyk |  |
| 5,141,683 | A | * | 8/1992 | Hyndman et al. | 264/44 |
| 5,205,970 | A |  | 4/1993 | Brun et al. |  |
| 5,382,456 | A |  | 1/1995 | Hocking et al. |  |
| 5,464,583 | A |  | 11/1995 | Lessing |  |
| 5,509,555 | A |  | 4/1996 | Chaing et al. |  |
| 5,620,804 | A |  | 4/1997 | Kennedy et al. |  |
| 5,865,922 | A |  | 2/1999 | Behrendt et al. |  |
| 5,945,166 | A |  | 8/1999 | Singh et al. |  |
| 6,447,852 | B1 | * | 9/2002 | Gordeev et al. | 427/577 |
| 6,919,127 | B2 | * | 7/2005 | Waggoner et al. | 428/325 |

FOREIGN PATENT DOCUMENTS

| DE | 197 11 831 A1 | 9/1998 |
|---|---|---|
| EP | 0 372 708 A | 6/1990 |
| EP | 0 798 280 A2 | 10/1997 |

OTHER PUBLICATIONS

Lim, C.B. et al.; Microstructure and mechanical properties of RB-SiC/MoSi2 composite. 1989. Journal of Materials Science, 24, 4144-4151.*

J.S. Haggerty and Y.-M. Chaing, "Reaction-Based Processing Methods for Ceramics and Composites", *Ceram. Eng. Sci. Proc.*, 11[7-8] pp. 757 and 760-781 (1990).

Leszek Hozer et al., "Reactive-infiltration processing of SiC-metal and SiC-intermetallic composites", *Journal of Materials Research*, vol. 11, No. 9, Sep. 1996, pp. 2346-2357.

Leszek Hozer et al., "Phase Composition Control in SiC Composites Prepared by Reactive-Infiltration with Metal-Silicon Alloys", in *Advanced Synthesis and Processing of Composites and Advanced Ceramics, Ceramic Trans.*, v56, American Ceramic Society, Inc., 1995, pp. 157-165.

(Continued)

*Primary Examiner*—Roy King
*Assistant Examiner*—Ngoclan T Mai
(74) *Attorney, Agent, or Firm*—Jeffrey R. Ramberg

(57) ABSTRACT

Composite bodies made by a silicon metal infiltration process that feature a metal phase in addition to any residual silicon phase. Not only does this give the composite material engineer greater flexibility in designing or tailoring the physical properties of the resulting composite material, but the infiltrant also can be engineered compositionally to have much diminished amounts of expansion upon solidification, thereby enhancing net-shape-making capabilities. These and other consequences of engineering the metal component of composite bodies made by silicon infiltration permit the fabrication of large structures of complex shape. Certain liquid-based preforming techniques are particularly well suited to the task, particularly where a high volumetric loading of the reinforcement component is desired.

4 Claims, 8 Drawing Sheets

OTHER PUBLICATIONS

N. Ehsani, A.J.Ruys, and C.C. Sorrell, "Thixotropic Casting of Ceramics", Article 1518 on Internet website www.azom.com, abstracted from International Ceramic Monographs, vol. 2, "Thixotropic Casting of Nonclay Ceramics", 1996.

A.J.Ruys, S.A. Simpson, and C.C. Sorrell, "Thixotropic Casting as a Technique for Producing Ceramic Matrix Composites", Article 2615 on Internet website www.azom.com, abstracted from International Ceramic Monographs, vol. 1, No. 1, "Thixotropic Casting of Ceramic Matrix Composites", pp. 692-700, 1994.

A.J. Whitehead and T.F. Page, "Fabrication and characterization of some novel reaction-bonded silicon carbide materials", *J. Mat. Sci.*, Feb. 1, 1992, pp. 839-852, v.27, No. 3, Chapman and Hall, London, GB.

* cited by examiner

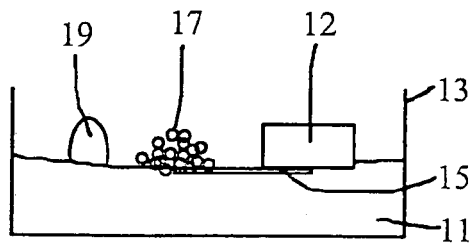
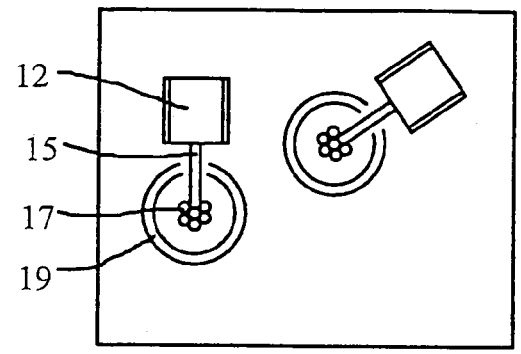
FIG. 4A  FIG. 4B
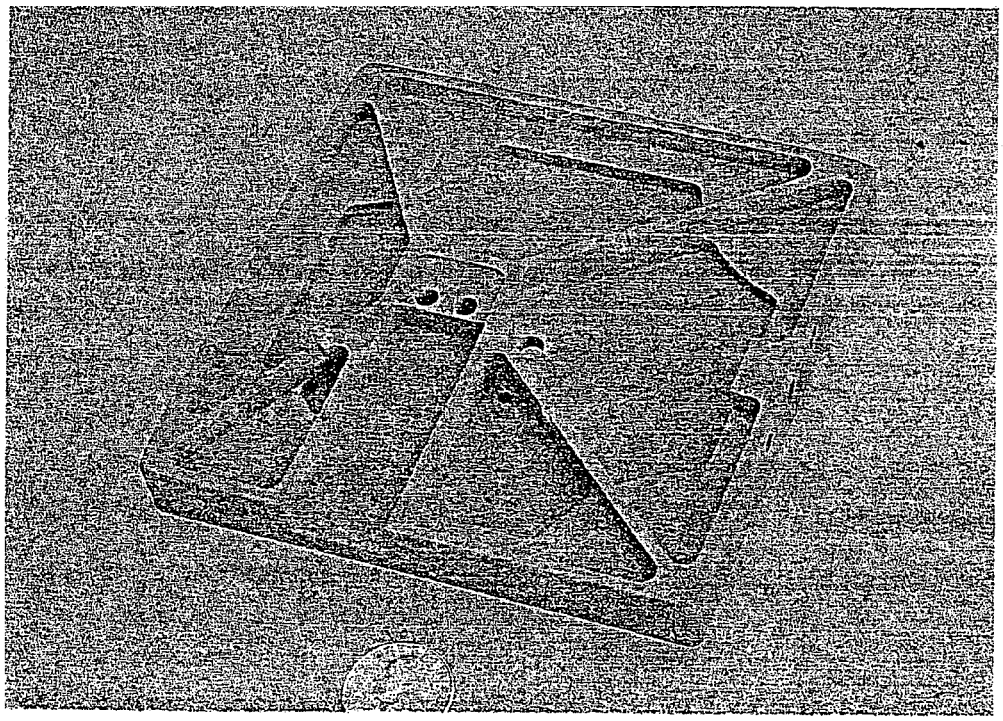
FIG. 5

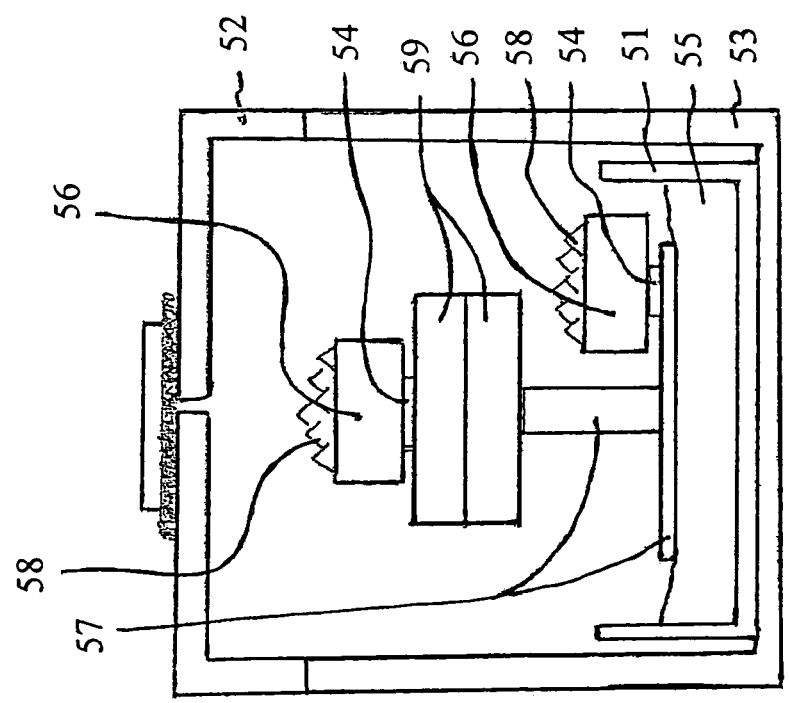
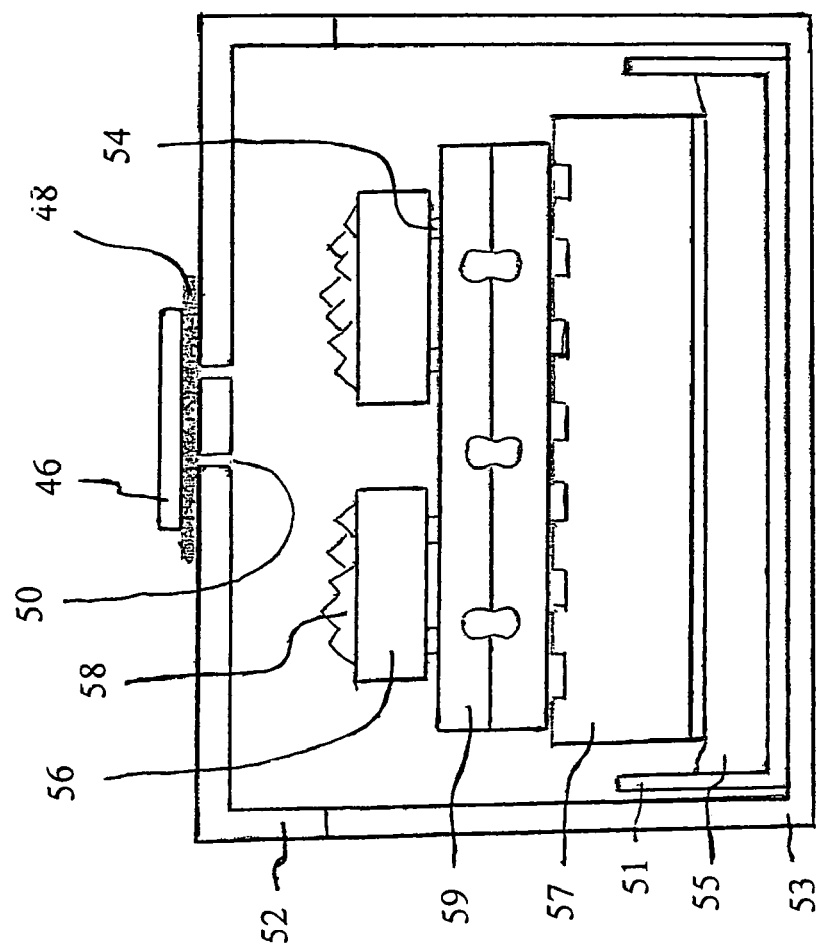
FIG. 8B
FIG. 8A

SILICON-CONTAINING COMPOSITE BODIES, AND METHODS FOR MAKING SAME

CROSS-REFERENCE TO RELATED APPLICATIONS

This patent document is a Continuation-in-Part of co-pending U.S. patent application Ser. No. 10/336,626, filed on Jan. 3, 2003, which is a Divisional of U.S. patent application Ser. No. 09/621,562, filed on Jul. 21, 2000, which issued as U.S. Pat. No. 6,503,572 on Jan. 7, 2003. This patent document also claims the benefit of U.S. Provisional Patent Application No. 60/623,485, filed on Oct. 30, 2004. The entire contents of each of these commonly owned patent applications is incorporated herein by reference.

BACKGROUND OF THE INVENTION

1. Field of the Invention

The present invention relates to improved composite materials and the melt infiltration methods for producing the same. Specifically, the present invention relates to silicon-based composites wherein potentially large components of potentially complex shape can be made accurate dimensionally, reliably, and utilizing relatively low processing temperatures. In a preferred embodiment, the silicon-based composite contains silicon carbide, at least a portion of which is produced by reactive infiltration.

2. Discussion of Related Art

Silicon carbide (SiC) composites have been produced by reactive infiltration techniques for decades. In general, such a reactive infiltration process entails contacting molten silicon (Si) with a porous mass containing silicon carbide plus carbon in a vacuum or an inert atmosphere environment. A wetting condition is created, with the result that the molten silicon is pulled by capillary action into the mass, where it reacts with the carbon to form additional silicon carbide. This in-situ silicon carbide typically is interconnected. A dense body usually is desired, so the process typically occurs in the presence of excess silicon. The resulting composite body thus contains primarily silicon carbide, but also some unreacted silicon (which also is interconnected), and may be referred to in shorthand notation as Si/SiC. The process used to produce such composite bodies is interchangeably referred to as "reaction forming", "reaction bonding", "reactive infiltration" or "self bonding".

Reaction bonded silicon carbide (sometimes referred to in shorthand notation as "RBSC") ceramics combine the advantageous properties of high performance traditional ceramics, with the cost effectiveness of net shape processing. Reaction bonded silicon carbide ceramic offers extremely high levels of mechanical and thermal stability. It possesses high hardness, low density (similar to Al alloys) and very high stiffness (~70% greater than steel). These properties lead to components that show little deflection under load, allow small distances to be precisely controlled with fast machine motion, and do not possess unwanted low frequency resonant vibrations. In addition, due to the high stiffness and hardness of the material, components can be ground and lapped to meet stringent flatness requirements. Moreover, as a result of very low coefficient of thermal expansion (CTE) and high thermal conductivity, RBSC components show little distortion or displacement with temperature changes, and are resistant to distortion if localized heating occurs. Furthermore, both Si and SiC possess refractory properties, which yields a composite with good performance in many high temperature and thermal shock applications. Finally, dense, high purity SiC coatings can be applied when extremely high purity and/or superior resistance to corrosion are required.

In one of the earlier demonstrations of this technology, Popper (U.S. Pat. No. 3,275,722) produced a self-bonded silicon carbide body by infiltrating silicon into a porous mass of silicon carbide particulates and powdered graphite in vacuo at a temperature in the range of 1800 to 2300° C.

Taylor (U.S. Pat. No. 3,205,043) also produced dense silicon carbide bodies by reactively infiltrating silicon into a porous body containing silicon carbide and free carbon. Unlike Popper, Taylor first made a preform consisting essentially of granular silicon carbide, and then he introduced a controlled amount of carbon into the shaped mass. In one embodiment of his invention, Taylor added the carbon in the form of a carbonizable resin, and then heated the mass containing the silicon carbide and infiltrated resin to decompose (carbonize) the resin. The shaped mass was then heated to a temperature of at least 2000° C. in the presence of silicon to cause the silicon to enter the pores of the shaped mass and react with the introduced carbon to form silicon carbide.

In spite of the many outstanding properties, including high specific stiffness, low coefficient of thermal expansion, and high thermal conductivity enumerated above, reaction bonded SiC ceramics generally have low fracture toughness, and therefore may not be optimal in applications where impact loading will occur.

In response, materials investigators have experimented with various techniques for enhancing the toughness or impact resistance of such inherently brittle ceramic-rich materials. Perhaps the most popular approach has been to incorporate fibrous reinforcements and attempt to achieve crack deflection or fiber debonding and pull-out mechanisms during the crack propagation process.

Hillig and his colleagues at the General Electric Company, motivated in part by a desire to produce silicon carbide refractory structures having higher impact strength than those of the prior art, produced fibrous versions of Si/SiC composites, specifically by reactively infiltrating carbon fiber preforms. See, for example, U.S. Pat. No. 4,148,894.

More recently, German Patent Publication No. DE 197 11 831 to Gadow et al. disclosed a reaction-bonded silicon carbide composite body featuring high heat resistant fibers, in particular those based on silicon/carbon/boron/nitrogen, for example, carbon or silicon carbide. The composite body was formed by the melt infiltration of a silicon alloy into a porous preform containing the fibers. The alloying element for the silicon-based infiltrant may consist of iron, chromium, titanium, molybdenum, nickel and/or aluminum, with iron and chromium being preferred, and with 5-50% iron and 1-10% chromium being particularly preferred. The alloying addressed the problem of the jump-like internal strain caused by the volume increase of silicon upon freezing. Previously, in large or thick-walled articles, this cooling strain was sufficiently large in many cases as to manifest itself as microfractures throughout the composite body. Thus, the stability of the material was reduced, and a critical growth of the fractures was to be expected under application of alternating thermal and mechanical stress. Accordingly, by alloying the silicon phase, the jump-like strain was reduced or even avoided, thereby solving the problems associated with the silicon cooling strain. The exchange of some brittle silicon for a different metal also led to a clear increase in toughness and ductility of the composite body.

At a minimum, the matrix of Gadow et al. contains iron. In a further refinement, it is preferred to add to the iron-containing silicon matrix, further additives of chromium, titanium, aluminum, nickel or molybdenum in a suitable ratio for the formation of a passivation layer, so that it results in improved oxidation resistance and corrosion resistance. With specific regard to the aluminum addition, it is known from ferrous metallurgy that aluminum is never present in iron-based alloys in amounts more than about one or two percent. This is because aluminum is chemically reactive with iron, and additions of aluminum to iron will tend to form iron aluminides rather than result in elemental aluminum dissolved in iron.

In spite of the toughening afforded by the alloying, Gadow et al. still rely on fibrous reinforcement. In fact, they attribute part of the strength of the composite to its fibrous reinforcement, and the fact that they treated the fibers gently during the granulation process so as to not damage them and thus impair their strength. Fibers, particularly fibers based on silicon carbide, can be expensive. Further, short fibers such as chopped fibers or whiskers, can pose a health hazard, and efforts must be taken to insure that such fibers do not become airborne or breathed. Fibers are often added to a ceramic composition to enhance toughness through debonding and pull-out relative to the matrix. If another way could be found to toughen the silicon carbide composite bodies of interest, then one could dispense with the fibers.

Further, at least some of the infiltrant alloy compositions disclosed by Gadow, such as Fe35-Si65 alloy, have a melting point below that of pure silicon, and it would seem possible and even advantageous to take advantage of this phenomenon. Gadow acknowledges the lower melting point, but fails to take advantage of it, and instead recommends infiltrating at temperatures well above the silicon melting point, such as at 1550° C. and 1700° C., in his Examples 1 and 2, respectively.

Chiang et al. (U.S. Pat. No. 5,509,555) disclosed the production of composite bodies by a pressureless reactive infiltration. The preform to be infiltrated by the alloy can consist of carbon or can consist essentially of carbon combined with at least one other material such as a metal like Mo, W, or Nb; a carbide like SiC, TiC, or ZrC; a nitride like $Si_3N_4$, TiN or AlN; an oxide like $ZrO_2$ or $Al_2O_3$; or an intermetallic compound like $MoSi_2$ or $WSi_2$, or mixtures thereof. In any event, the preform bulk density is rather low, about 0.20-0.96 g/cc. The liquid infiltrant included silicon and a metal such as aluminum, copper, zinc, nickel, cobalt, iron, manganese, chromium, titanium, silver, gold, platinum and mixtures thereof.

In a preferred embodiment of the Chiang et al. invention, the preform could be a porous carbon preform, the liquid infiltrant alloy could be a silicon-aluminum alloy containing in the range of from about 90 at % to about 40 at % silicon and in the range of from about 10 at % to about 60 at % aluminum and the carbon preform could be contacted with the silicon-aluminum alloy at a temperature in the range of from about 900° C. to about 1800° C. for a time sufficient so that at least some of the porous carbon reacted to form silicon carbide. Upon cooling, the dense composite formed thereby can be characterized by a phase assemblage comprising silicon carbide and at least one phase such as silicon-aluminum alloy, a mixture of silicon and aluminum, substantially pure aluminum or mixtures thereof.

One problem with infiltrating multi-constituent liquids into preforms containing large fractions of carbon is that the infiltrant chemistry can change dramatically over the course of infiltration, as well as from one location to another within the preform. Table 3 of Chiang et al. demonstrates this point. There, the infiltrant started out as being about 54 at % Si, 46 at % Cu, but after infiltration into a carbon preform, it was substantially 100% Cu. Such drastic compositional changes can make processing difficult; this same Table revealed that when the infiltrant alloy started out at about 30 at % Si, 70 at % Cu, pressure was required to achieve infiltration. Pressure infiltrations require much more complex and expensive equipment than do pressureless infiltration techniques, and usually are more limited in the size and shape of the parts that can be produced thereby. Thus, while the present invention is not limited to pressureless systems, unless otherwise noted, the infiltrations of the present invention refer to those not requiring the application of pressure.

Chiang et al. stated that their method allows production of composites very near net-shape without a need for additional machining steps. They described a number of non-machining techniques for removing the residual, unreacted liquid infiltrant alloy remaining on the reacted preform surface. Specifically, Chiang et al. stated that following infiltration, the composite body could be heated to a temperature sufficient to vaporize or volatilize the excess liquid alloy on the surface. Alternatively, the reacted preform could be immersed in an etchant in which the excess unreacted liquid infiltrant is dissolved while the reacted preform is left intact. Still further, the reacted preform could be contacted with a powder that is chemically reactive with the unreacted liquid infiltrant alloy such as carbon, or a metal like Ti, Zr, Mo or W.

In U.S. Pat. No. 5,205,970, Milivoj Brun et al. also was concerned with removing excess infiltrant following production of silicon carbide bodies by an infiltration process. Specifically, Brun et al. contacted the reaction formed body with an infiltrant "wicking means" such as carbon felt. More generally, the wicking means could comprise porous bodies of infiltrant wettable materials that are solid at the temperature at which the infiltrant is molten. Preferably, the wicking means has capillaries that are at least as large or larger than the capillaries remaining in the reaction formed body. Thus, infiltrant in the reaction-formed body that was filling porosity remained in the reaction formed body instead of being drawn into the wicking means and leaving porosity in the reaction formed body. The infiltrant could be silicon or a silicon alloy containing a metal having a finite solubility in silicon, the metal being present up to its saturation point in silicon.

The "wicking means" solution of Brun et al. to the problem of removing excess adhered silicon, while perhaps effective, nevertheless requires the additional processing steps of contacting the formed composite body with the wicking means and re-heating to above the liquidus temperature. What is needed is a means for eliminating or at least minimizing the degree of residual infiltrant adhered to the formed composite body.

Thus, it is an object of the present invention to produce a silicon-containing composite body of improved toughness, preferably without reliance on fibrous reinforcement as a toughening mechanism.

It is an object of the present invention to produce a composite body by an infiltration process whereby the residual infiltrant phase has a controllable volume change upon solidification.

It is an object of the present invention to produce a composite body of increased thermal conductivity.

It is an object of the present invention to produce a composite body whose physical properties are at least somewhat tailorable by the presence of the additional metallic constituent(s) in the infiltrant material.

It is an object of the present invention to be able to produce a composite body at a temperature that is less than the melting point of pure silicon.

It is an object of the present invention to produce a composite body without having to rely on boron-containing materials or expensive molds being in direct contact with the preform or infiltrant material to control the extent of infiltration, e.g., "infiltration blockers".

It is an object of the present invention to be able to produce composite bodies that are large, unitary structures.

It is an object of the present invention to be able to produce composite bodies of complex shape that are highly loaded in reinforcement material.

It is an object of the present invention to be able to produce composite bodies containing little to no in-situ silicon carbide phase.

It is an object of the present invention to be able to produce composite bodies in large numbers at a high rate of speed.

It is an object of the present invention to produce a composite body to near-net shape, thereby minimizing the amount of grinding and/or machining necessary to achieve the required dimensions of the finished article.

It is an object of the present invention to produce a composite body where any required grinding or machining can be performed substantially entirely at the preform stage.

It is an object of the present invention to produce a composite body where fine detail can be ground and/or machined into the body at the preform stage.

SUMMARY OF THE INVENTION

These objects and other desirable attributes of the present invention are accomplished through careful control of materials used and of a number of the processing conditions employed in making composite bodies by infiltration of a molten silicon-containing metal. Specifically, and in accordance with a first major aspect of the present invention, the infiltrant material comprises at least two constituents, and at least one of the constituents contains metallic silicon.

It has been noted that silicon undergoes a net volume expansion of about 9 percent upon solidification. Thus, in accordance with one preferred embodiment of the present invention, by mixing or alloying the silicon with a material that undergoes a net volume shrinkage upon solidification, it is possible to produce a silicon-containing composite body having a residual infiltrant component that undergoes much less, or perhaps even substantially no net volume change upon solidification. Thus, production of silicon-containing composite bodies that exhibit neither solidification porosity nor solidification exuding of the infiltrant component can be realized.

Carbon is frequently added to the porous mass to enhance infiltration. (Unless otherwise noted, from hereon the term "porous mass" will be understood to include the term "preform".) One ramification of using a multi-constituent infiltrant, however, is the change that takes place in the chemical composition of the infiltrant as it infiltrates the porous mass or preform, and specifically as the silicon constituent of the infiltrant metal reacts with the carbon contained therein to produce silicon carbide. Accordingly, the present inventors have discovered the significance and importance of keeping the reactable or "free" carbon content of the porous mass to be infiltrated at relatively low levels. Preferably, the amount of free carbon in the porous mass is kept as low as necessary to accomplish complete infiltration in a reliable manner but without unduly compromising the binder qualities of the carbon when preforms (e.g., self-supporting porous masses) are used. This way, large bodies can be infiltrated with minimal changes in the infiltrant metal's composition, thereby resulting in a silicon carbide composite body having a dispersed residual metal component of relatively uniform composition throughout the body.

The use of a multi-constituent infiltrant composition has additional advantages beyond the ability to produce composite bodies whose residual metal component has zero or near-zero volumetric change (swelling or contraction) upon solidification.

For instance, and in another major aspect of the present invention, the alloying of silicon infiltrant with one or more different elemental constituents can substantially depress the melting point of the infiltrant. Desirable alloying elements in this regard include aluminum, beryllium, copper, cobalt, iron, manganese, nickel, tin, zinc, silver and gold. The lowered melting or liquidus temperatures permit the infiltration to be conducted at lower temperatures. For example, when the infiltrant comprises a silicon-aluminum alloy, it is possible to infiltrate a porous mass comprising some elemental carbon at a temperature in the range of about 11000 to about 1300° C. By way of comparison, when the infiltrant consists essentially of silicon, the temperature must be maintained at least above the silicon melting point of about 1412° C., and often substantially above the melting point so that the melt is sufficiently fluid. One of the most important consequences of being able to operate at lower temperatures is the discovery that at the lower temperatures, the infiltration is more reliably terminated at the boundaries of the porous mass. Further, instead of having to use expensive graphite molds to support the porous mass and to confine the liquid infiltrant, cheaper materials such as a loose mass of ceramic particulate may be used. Thus, the ability to conduct infiltrations at lower temperatures gives operators more control over the process, not to mention saving time and energy.

Alloying of silicon may also help suppress unwanted by-product chemical reactions. For example, additions of a source of carbon and/or boron to silicon can help ameliorate the tendency of molten silicon to chemically react with boron carbide, a candidate reinforcement material.

The preferred silicon-aluminum infiltrant material enhances a number of properties of the resulting composite material. For example, the aluminum-toughened reaction-bonded SiC of this invention provides a nominally 75% increase in fracture toughness relative to the toughness provided by "ordinary" reaction-bonded SiC consisting essentially of SiC and Si. This toughness allows the composite to be used in applications where some impact will occur. In addition, the composite can be used in thin-walled component designs that would be difficult to produce with a low-toughness ceramic.

The presence of the aluminum results in an increase in thermal conductivity relative to the standard reaction-bonded SiC product, which is valuable in heat sink applications or in components where localized heating can occur. In addition, the thermal conductivity is in excess of that of most metal matrix composites (MMCs) because no additional metallic alloying elements are used. In general, thermal conductivity of an alloy decreases as constituents are added.

BRIEF DESCRIPTION OF THE FIGURES

FIGS. 4A and 4B are side and top schematic views, respectively, of an arrangement of materials used to produce a silicon carbide composite "U-channel" in accordance with Example 4;

FIG. 5 is a photograph of a silicon carbide composite air bearing support frame produced in accordance with Example 6;

FIGS. 8A and 8B are front and side schematic views, respectively, of a setup used to produce the beam structure of Example 6.

DEFINITIONS

"Blockers" or "Infiltration blockers", as used herein, mean materials that can be used to halt the progress of infiltration of the molten infiltrant.

"Foundation" or "foundation material", as used herein, means the substantially non-infiltratable material that is used to support the components that participate in the infiltration process, such as the molten infiltrant and the porous mass to be infiltrated. These materials can be porous or not, and can be either free-flowing or self-supporting.

"RBSC", as used herein, means reaction-bonded silicon carbide.

"Reaction-Bonding", "Reaction-Forming", "Reactive Infiltration" or "Self-Bonded", as used herein, means the infiltration of a porous mass (such as a preform) containing carbon (in a form that is available to react) by an infiltrant containing silicon metal to produce a composite body containing at least some silicon carbide produced in-situ.

"Reinforcement", as used herein, means a material that is provided to the porous preform to be infiltrated, and is substantially non-reactive with the molten infiltrant. Thus, the reinforcement material is present in the formed composite body, and is generally distributed throughout the composite body, particularly through the phases of in-situ SiC and residual infiltrant material. Thus, the physical properties of the reinforcement contribute at least in part to the overall physical properties of the composite material. "Filler" is substantially synonymous with "reinforcement".

"Siliconizing", as used herein, means the infiltration of a porous mass such as a preform containing very little or no reactable carbon, with a molten infiltrant containing silicon metal, at least the silicon constituent being substantially non-reactive with the constituents of the porous preform, to produce a composite body having a matrix containing silicon metal and very little to no in-situ silicon carbide.

DETAILED DESCRIPTION OF THE INVENTION AND PREFERRED EMBODIMENTS

Figure 1:
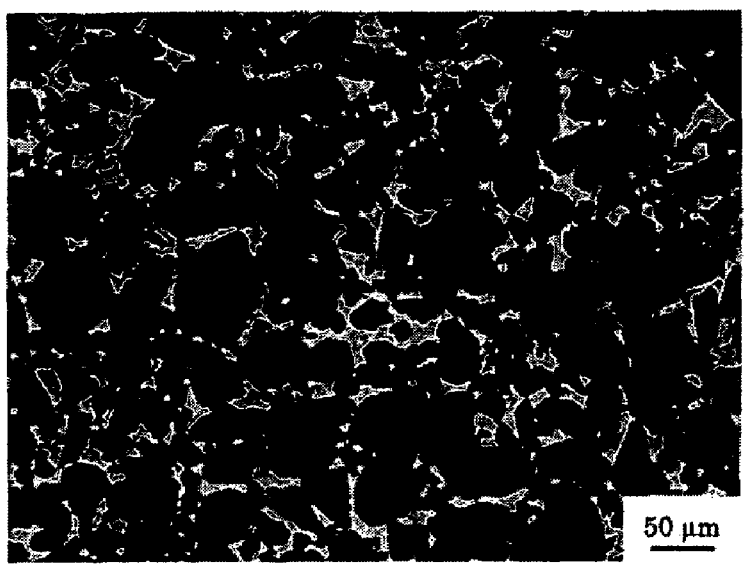
FIG. 1 is a photomicrograph of a polished cross-section of unalloyed RBSC material similar to that of Example 1.
Figure 2:
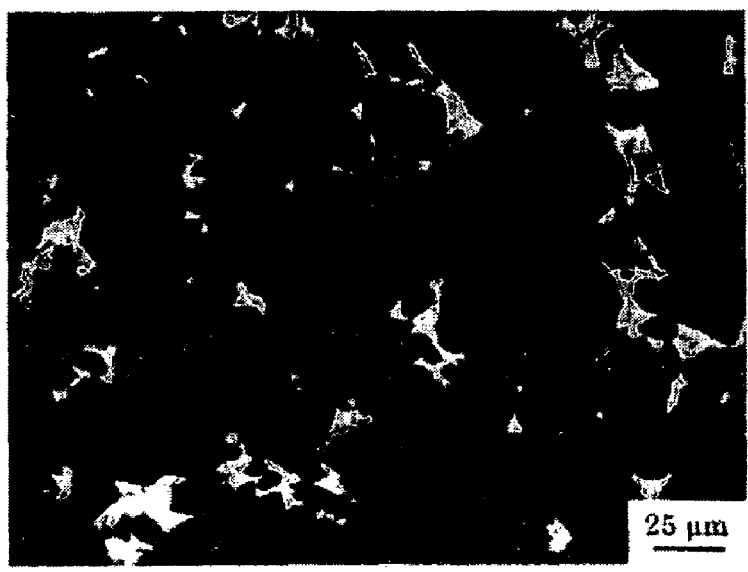
FIG. 2 is a photomicrograph of a polished cross-section of aluminum-alloyed RBSC material similar to that of Example 2.

According to the methods of the present invention, a porous mass containing at least one reinforcement material and optionally carbon is infiltrated with a molten, multi-constituent metal containing silicon. Typically, a wetting condition exists or is created between the molten metal and the bodies of material making up the porous mass so that the infiltration can occur by capillarity. Although possibly modified somewhat compositionally, typically some infiltrant metal remains in the infiltrated body, and distributed throughout the composite body and distributed throughout the one or more reinforcement materials. The body thus formed containing the reinforcement material(s) and residual infiltrant metal is therefore a composite body. When the porous mass contains some reactable ("free") carbon, the silicon component of the infiltrant may react with this carbon to form silicon carbide. This silicon carbide is sometimes referred to as "in-situ" silicon carbide. FIGS. 1 and 2 show the effect of the additional infiltrant constituent on the resulting microstructure. Specifically, FIG. 1 illustrates a typical RBSC microstructure in which the infiltrant is substantially pure silicon. In contrast, FIG. 2 shows a RBSC microstructure in which the infiltrant also contains some aluminum. The aluminum phase is the one that is the lightest in the photo.

If the starting amount of infiltrant metal is insufficient to fill the interstices of the porous mass, at least some of the residual, unreacted metal in the body may be distributed as discrete, isolated pockets. Usually an excess of infiltrant metal is supplied to the porous mass, and the residual metal in the composite body is interconnected.

The present invention encompasses placing one, several or all of the constituents of the multi-component infiltrant within the porous mass to be infiltrated, or at an interface between the mass and an adjacent body of the infiltrant metal. Preferably though, the constituents of the infiltrant material are provided as an alloy, possibly in ingot or other bulk form, that is then brought into contact with the porous mass to be infiltrated. The infiltrant metal may be placed into direct contact with the porous mass to be infiltrated, or the infiltrant metal may remain substantially isolated from the porous mass, with a wicking means interposed between the two to create a pathway or conduit for the molten infiltrant metal to migrate toward and into the porous mass. The wicking means could be most any material that is wet by molten infiltrant metal, with silicon carbide being preferred.

In one embodiment that is particularly useful for making hollow composite bodies, or at least a composite body having a shaped interior surface, the solid body of infiltrant metal may be shaped, for example, by machining, and then the porous mass to be reactively infiltrated is contacted to at least a portion of that shaped surface of the infiltrant metal. When the infiltrant metal infiltrates the porous mass, that portion is reproduced in opposite or inverse form in the formed silicon-containing composite body. For instance, if the shaped infiltrant metal is substantially completely covered with the material of the porous mass, the resulting composite body is hollow, and whose interior surfaces are the inverse or opposite shape of the infiltrant metal. That is, if the shaped body of infiltrant metal still existed, it could be fit with the formed composite body like two jigsaw puzzle pieces. The thickness of the formed composite body here may be regulated by the amount or thickness of porous material brought into contact with the infiltrant metal, and by the amount of infiltrant metal available for infiltration.

In one embodiment, the present invention contemplates producing in-situ silicon carbide. Accordingly, the porous mass or preform to be infiltrated contains free carbon, and at least one constituent of the multi-constituent infiltrant material is silicon. The other constituent(s) may be any that are capable of producing some desirable effect during processing or on the final character or properties of the resulting composite body. For example, the non-silicon constituent(s) may give rise to an alloy having a lower liquidus temperature than the melting point of pure silicon. A reduced liquidus temperature might then permit the infiltration to be conducted at a lower temperature, thereby saving energy and time, as well as reducing the tendency for the infiltrant to over-infiltrate the boundaries of the preform or porous mass into the supporting materials. Moreover, a non-silicon constituent infiltrated into the porous mass along with the reactive silicon constituent may produce superior properties of the resulting composite body—enhanced strength or toughness, for instance. Further, a non-silicon constituent so infiltrated may also counteract the expansion of the silicon phase upon solidification, a desirable result from a number of standpoints, as will be discussed in more detail later. Elemental non-silicon constituents that fulfill one or more of the advantageous attributes include aluminum, beryllium, copper, cobalt, iron, manganese, nickel, tin, zinc, silver, gold, boron, magnesium, calcium, barium, strontium, germanium, lead, titanium, vanadium, molybdenum, chromium, yttrium and zirconium. Preferred constituents include aluminum, copper, iron, nickel, cobalt and titanium. Particularly preferred are aluminum and copper. Still further, a non-silicon constituent raises the possibility of being able to tailor one or more properties of the resulting silicon-containing composite body, such as CTE or thermal conductivity, by adjusting the kind and proportion of the constituents of the infiltrant metal.

One such metallic constituent that has been identified as fulfilling these three desirable attributes is aluminum. The present inventors have observed that a silicon-containing composite body that also contains some aluminum-containing phase is substantially tougher than a silicon-containing composite containing residual, unreacted silicon. Still further, the present inventors have discovered that when the residual infiltrant component of the composite body comprises about 40 to 60 percent by weight silicon and 60 to 40 percent aluminum, the volume change of the residual infiltrant phase is practically zero. In a particularly preferred embodiment, a preform containing silicon carbide particulate and about one to several percent by weight of carbon may be readily infiltrated in a rough vacuum at about 1100° C. with an infiltrant alloy containing roughly equal weight fractions of silicon and aluminum to produce a composite body containing silicon carbide plus residual alloy having a composition of about 40 to 45 percent by weight silicon, balance aluminum. In addition, the present inventors have discovered that at this lower infiltration temperature of about 1100° C., a loose mass of silicon carbide particulate can be used to support the porous mass or preform to be infiltrated without itself being infiltrated by the molten infiltrant. This discovery greatly simplifies the furnacing operation and obviates the need for expensive graphite fixturing and tooling.

The ability to toughen silicon-containing composite bodies through additions to the silicon infiltrant has important beneficial consequences. For instance, previously, the preferred approach to toughen these rather inherently brittle materials was to add a fibrous reinforcement to the composite. But this approach has a number of drawbacks. Long fibers are not very amenable to ceramic processing requiring stirring. Short fibers may pose a respiration hazard. The presence of fibers may degrade the surface finish that can be achieved during green machining, particularly if the fibers are added in the form of bundles, which is a popular approach in the prior art. For the toughening to be realized, the fibers should debond and pull out of the surrounding matrix. Often, one or more coatings must be applied to the fibers to achieve this effect, which adds to cost and complexity of the system. Coated fibers often have to be treated gently during processing, lest the coatings be damaged, and this would likely eliminate certain processing techniques such as Muller mixing or ball milling. Thus, the ability to toughen silicon-containing composites without reliance on fiber additions is significant.

In general, the temperature at which the infiltration is conducted is the lowest at which infiltration occurs quickly and reliably. Also, in general, the higher the temperature, the more robust is the infiltration. Unnecessarily high infiltration temperatures are not only wasteful in terms of energy costs and the extra heating and cooling time required, but the more likely it is that undesired "side" reactions can occur. A number of ceramic materials that are usually thought of as being inert and uninfiltratable at moderate temperatures (e.g., aluminum oxide, boron nitride, silicon nitride) can lose their inert character or are infiltrated by silicon at elevated temperatures (e.g., about 1500° C. and above), particularly under vacuum. Thus, it becomes quite a challenge to house or support a porous mass to be infiltrated and to minimize the degree of over-infiltration into the supporting material, or reaction therewith. Such over-infiltration typically results in the over-infiltrated material being bonded to the infiltrated mass, necessitating costly grinding or diamond machining for its removal. Another problem with unnecessarily excessive infiltration temperatures is that the non-silicon constituent(s) may have a higher vapor pressure than the silicon constituent, with the undesirable result that such constituent is readily volatilized out of the infiltrant alloy, changing the overall infiltrant chemistry and contaminating the furnace.

The atmosphere in which the infiltration of a silicon-containing metal is conducted is usually one that is inert or mildly reducing. Accordingly, argon, helium, forming gas and carbon monoxide may be used. A vacuum environment is preferred, however, at least from the standpoint of facilitating the reliability or robustness of infiltration.

Of course, the mass or preform to be infiltrated by the silicon-containing infiltrant must be one that is permeable to the infiltrant under the local processing conditions. Given sufficient temperature, e.g., about 2150° C., a porous mass of pure silicon carbide can be infiltrated by silicon metal in a pressureless manner (see for example, U.S. Pat. No. 3,951,587 to Alliegro et al.), but more typically, the porous mass contains some elemental or free carbon to facilitate the process. The more carbon that is present, the more silicon carbide that is produced in-situ. While it is possible to reactively infiltrate a porous mass containing large amounts of carbon, such is generally undesirable in the context of the present invention for a variety of reasons. For example, the molten infiltrant metal will change too much compositionally from one zone in the preform to the next. Large compositional changes are usually undesirable for at least two reasons: First, the altered metal composition may be such that it no longer wets the porous mass to be infiltrated. Second, a porous mass that is successfully fully infiltrated would have to be maintained at some elevated temperature for a period of time to allow the distribution of constituents of the infiltrant metal to equilibrate. For large components, such "annealing times" could be so long as to be impractical.

Another reason why large amounts of carbon are undesirable is due to the volume change of about 2.35 times upon chemical reaction of the carbon. If the volume of the SiC that is produced cannot be accommodated in the preform, the composite body could swell, hurting dimensional control, or worse, could result in cracking.

Figure 3:
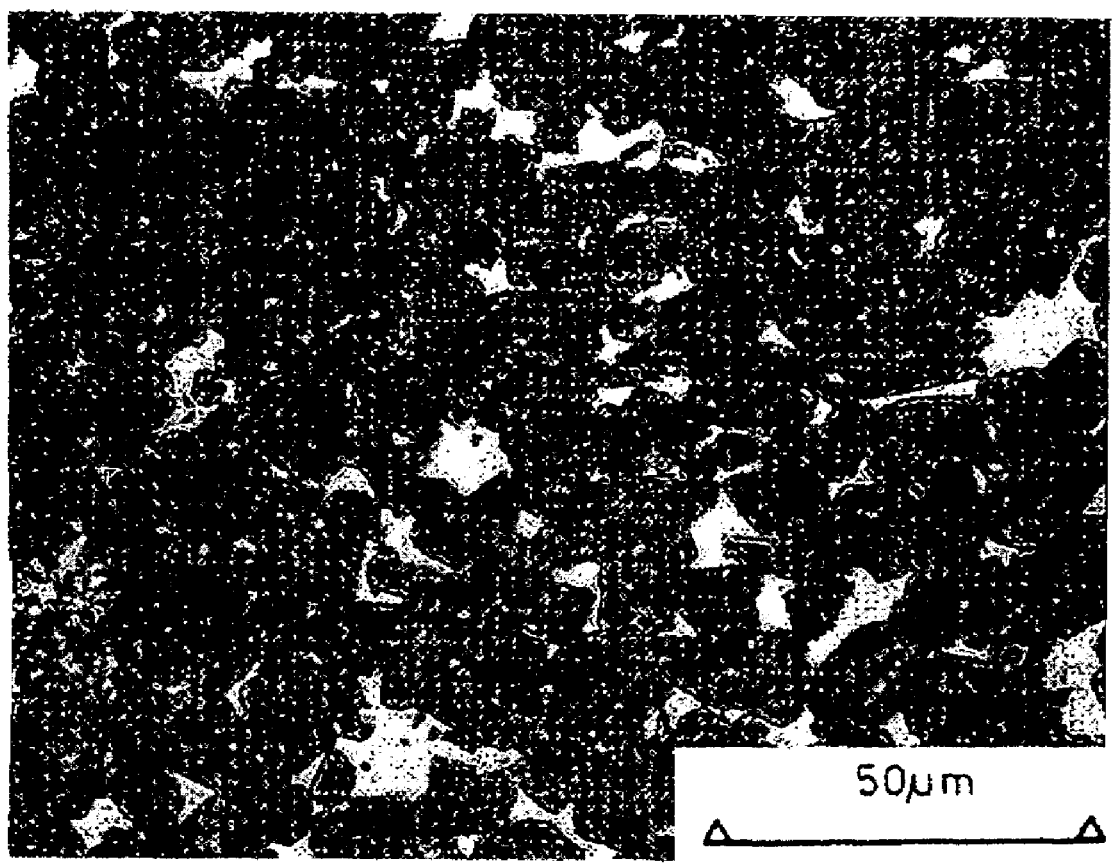
FIG. 3 is a photomicrograph of a polished cross-section of prior art RBSC material.

Still further, and as illustrated in FIG. 3, large amounts of carbon reaction cause the formed in-situ SiC to form large zones of interconnected SiC. It is as though these zones behave as one large SiC particle, which is deleterious to some properties such as strength and ballistic resistance, and impairs the surface finish that can be attained in machining or grinding. This micrograph, which appears on page 47 of R. Morrell's *Handbook of Properties of Technical Engineering Ceramics* (1985), is representative of prior art reaction-bonded silicon carbide. The contrast with FIG. 1, which represents the assignee's unalloyed RBSC material, such as that of Example 1 herein, is striking. The microstructure of this preferred embodiment almost appears as though a loose mass of carbon-free SiC particulate was infiltrated with silicon with substantially no reaction and no in-situ SiC formation, because, unlike FIG. 3, one can see nearly the entire "perimeter" of each SiC particle. However, there is indeed some in-situ SiC present, due to the presence of some carbon in the preform. In fact, the assignee's RBSC generally contains enough in-situ SiC as to form a network, e.g., interconnect the SiC reinforcement bodies together, although the network is rather tenuous or thin, yielding a small or light amount of such interconnectivity. Now looking at FIG. 2 again, in spite of the more complex microstructure due to the presence of the aluminum-bearing phase, one can again see most of the original cross-section of the SiC reinforcement particles, and that only a small amount of in-situ SiC has formed to produce a slight degree of interconnectivity among the particles.

Thus, producing a composite body having a relatively small grain size with only a light degree of interconnection by the in-situ SiC matrix phase represents a preferred embodiment of the invention. In this preferred embodiment, it is also important to keep processing temperatures from being "excessive", e.g., temperatures at which the grains can grow appreciably, or sinter together. For example, the transformation of silicon carbide from the beta to the alpha crystallographic form occurs at about 2050° C. The crystallographic transformation is often accompanied by extensive grain growth. Depending upon the exact conditions, it may be possible to heat to a slightly higher temperature (perhaps about 2100° C.) and still avoid this recrystallization. Sintering is also dependent to a degree on particle size, but the inventors note in the prior art where a SiC preform tube was pre-sintered at about 2150° C. prior to reactive infiltration with silicon. See, for example, U.S. Pat. No. 4,174,971 to Schrewelius. Accordingly, to maintain the low amount of interconnectivity to the preform particles, and to maintain the beta form of the in-situ SiC that is characteristic of this preferred embodiment, the inventors do not recommend conducting the infiltration, or post-processing the infiltrated mass, at temperatures in excess of about 2000° C.

Often times it is desirable to produce a composite body that is highly loaded in one or more hard or high-stiffness fillers such as SiC. It may be tempting to achieve high SiC loading by forming large amounts of beta (in-situ) SiC. Again, this approach is not preferred. Instead, what is desired is to reactively infiltrate a porous mass or preform that is highly loaded not with carbon but rather with the hard filler material(s). As an alternate embodiment of the invention, a preform highly loaded with hard filler materials but little or no reactable carbon is infiltrated with molten silicon (e.g., "siliconizing") or silicon-containing metal.

In this alternate embodiment, the silicon-infiltrated composite bodies of the instant invention can be made by a modified siliconizing process. Here, a multi-constituent molten infiltrant containing silicon, which may be a silicon alloy, is contacted to a porous mass of ceramic material that is wettable by the molten infiltrant under the processing conditions, which is generally taken to be a vacuum or inert gas (e.g., argon) environment. One ceramic material that can meet these requirements is SiC, which can be in the form of substantially non-connected particles such as a loose mass of particulate, or may be in the form of a lightly sintered or "bisque-fired" material, or may be heavily sintered and highly dense (but still containing interconnected pores). The presence of carbon in the reaction-bonding process assists in the infiltration there. Since this carbon is substantially if not completely lacking in the modified siliconizing process, the latter is generally not as robust an infiltration process as is the reaction-bonding process. Accordingly, somewhat higher infiltration temperatures may be required, such as about 1500° C. up to about 2000° C., and/or a vacuum environment (as opposed to inert gas environment, for example) may be required.

As a further alternative embodiment, the inventors also note that some applications, most notably the refractory applications, may benefit from having a relatively high degree of interconnection of the preform particles to one another. This can be accomplished by introducing a relatively large amount of carbon to the preform to produce large amounts of in-situ SiC, or by sintering the preform prior to or during infiltration, or some combination of these.

What the inventors prefer for the main embodiment of their invention is a porous mass containing not more than about 10 percent by volume carbon, and more preferably not more than about 6 percent. For many of the products contemplated by the present invention, a representative selection of which are shown in some of the Examples, a particularly preferred range is about 1 volume percent to about 5 percent.

The matter that makes up most or all of the balance of the porous mass may consist of one or more materials that are substantially inert under the process conditions, e.g., "reinforcement materials". Candidate reinforcements for use in the present invention would include the carbides such as SiC, $B_4C$, TiC and WC; the nitrides such as $Si_3N_4$, TiN and AlN; the borides such as $SiB_4$, $TiB_2$, and $AlB_2$; and oxides such as $Al_2O_3$ and MgO. The form of the reinforcement may be any that can be produced, for example, particulate, fiber, platelet, flake, hollow spheres, etc. The individual reinforcement bodies may range in size from under a micron to several millimeters, such as about 5 millimeters, with sizes ranging from several microns to several hundred microns being common. To best produce the preferred microstructure, the inventors prefer the form of the reinforcement to be individual, separate bodies such as particles, but in an alternative embodiment also embraced by the present invention, the reinforcement can be in reticulated, skeletal or otherwise interconnected form.

Many of the above-mentioned materials are not intrinsically infiltratable by silicon-containing melts under reasonable infiltration conditions. Thus, some of these materials might be candidates as the foundation or infiltration blocker materials, to be described in more detail later. However, by applying a coating material that is wettable and/or reactive with the silicon-containing infiltrant material, for example, carbon, at least some degree of infiltration into these materials usually can be achieved.

Other candidate reinforcements may tend to chemically react during processing. Boron carbide, for example, tends to react with molten silicon. Coating the boron carbide reinforcement may address the problem. Alternatively, the molten infiltrant sometimes can be modified compositionally to suppress this tendency for reaction. Dissolving some boron and optionally also some carbon into molten silicon (which can take up to several percent before saturating, depending on temperature) can help in this regard. This is taught by commonly owned U.S. Pat. No. 6,862,970, whose contents are incorporated herein by reference.

Even when the reinforcement includes silicon carbide, especially in particulate form, it is still possible to distinguish a silicon carbide matrix that is reaction-formed from the silicon carbide making up the reinforcement or filler material. Specifically, the reaction-formed silicon carbide typically is of the beta polymorph, at least under the instant processing conditions, e.g., relatively low processing temperatures. In contrast, most commercially available silicon carbide, particularly the commodity grades, is the alpha (i.e., high temperature) form that is so commonly used as a reinforcement material. Accordingly, analytical techniques known to those in the art can distinguish between the two forms and can provide at least approximate quantitative data as to the relative amounts of each that are present in the composite body. However, if the infiltration is conducted at high temperature, or if the composite body is post-processed at high temperature, e.g., above about 2000° C., the beta polymorph transforms irreversibly to the alpha form, making the in-situ SiC indistinguishable from the reinforcement SiC on this basis.

Porous masses containing one or more reinforcements may range appreciably in terms of their packing or theoretical density. For example, a porous mass comprising flakes, disorganized fibers, or a reticulated structure may be only 5 to 10 percent dense. At the other extreme, a sintered preform may be 85 to 95 percent dense. Infiltration, however, at least that using a bulk molten infiltrant, requires at least some of the pores of the porous mass be interconnected and contiguous to the exterior of the mass; closed pores cannot be infiltrated. Moreover, the choice of processing used to fabricate the preform can influence the packing density, as processing that uses a liquid phase in general packs more densely than does a technique that does not use a liquid vehicle, such as dry pressing. Thus, if nominally monosized reinforcement bodies can be dry pressed to densities of about 30-55 vol %, then slip or sediment cast preforms might be about 40-65 vol % loaded. However, reinforcement bodies having different sizes may be blended together, for example, to increase particle packing. Thus, such dry pressed preforms might be about 35-65 vol % loaded, and those cast using a liquid phase such as slip casting might be about 45-70 vol % loaded, and sediment cast or thixotropic cast preforms might be about 45-75 or 80 vol % loaded, or possibly even as high as about 85 vol %, depending upon the specific parameters. As can be seen, preform loading is very flexible and can be engineered to a high degree.

Although not required, a carbon source that may be added to the porous mass or preform usually can desirably take the form of elemental carbon, such as graphite, carbon black or lampblack. Thus, the carbon may be in crystalline or amorphous form. The form of the carbon component can become significant, however, when attempting to infiltrate reinforcements that are normally difficult to infiltrate, e.g., the oxides. While carbon in particulate form may be satisfactory for infiltrating a mass of silicon carbide, other reinforcements may necessitate that the carbon be reticulated or forming a network or skeletal structure. Especially preferred is carbon in the form of a coating on the reinforcement bodies. Such a form of carbon can be achieved by introducing the carbon into the porous mass in liquid form, as for example, a resin. The porous mass containing such a carbonaceous resin is then thermally processed to decompose or pyrolyze the resin to solid carbon, which may be graphite, amorphous carbon or some combination thereof. A number of carbonaceous resins are available including epoxy resins, phenolic resins and furfuryl alcohol. What is preferred in the present invention are carbohydrate-based resins such as those based on sugars or starches, but if more carbon is desired in the preform, then one may wish to consider resins such as phenolic resin or furfuryl alcohol, which offer higher "char yields". The resin infiltration and pyrolysis cycle may be repeated one or more times, which can also increase carbon content.

In addition to assisting in the infiltration process, another important role played by the carbonaceous resin is that of a binder. Although one can infiltrate a loose mass of reinforcement particulate, the more preferred route, especially where the goal is to make an article of some particular and desired shape, is to use a self-supporting preform. Typically, a loose mass of reinforcement is mixed with a binder, preferably here a carbonaceous binder, and then pressed or cast or molded to a desired shape using techniques known in the art. Curing the binder then renders the formed body self-supporting.

Careful observation of the differences in infiltratability of various porous masses has enabled these differences to be exploited to advantage. Specifically, and in a preferred embodiment, those materials that are substantially non-infiltratable under the process conditions can be used as "foundation" materials for supporting the porous mass to be infiltrated. This result is significant because these non-infiltratable support materials are usually significantly cheaper than the molds, housings or containers, which are sometimes referred to as "boats", and which are often fabricated from graphite.

Through careful observation and experiment, the present inventors have noted the general conditions (or trends in changing conditions) whereby infiltration tends to occur or is enhanced, and those conditions under which infiltration tends not to occur, or tends to be inhibited. For example, the inventors have observed that reactive infiltration of an infiltrant comprising silicon into a porous mass comprising carbon occurs more robustly when the carbon is present in elemental form rather than chemically combined with other elements. Furthermore, the infiltration is more robust when the elemental carbon is present in three-dimensionally interconnected form, as opposed to discrete particle form. When the porous mass includes a component other than elemental carbon, for example, aluminum nitride, the three-dimensionally interconnected elemental carbon phase could be present as, for example, a coating on at least some of the aluminum nitride bodies. Moreover, the infiltration is more robust when the temperature of infiltration is increased, both in terms of absolute temperature as well as in terms of the homologous temperature (e.g., percentage or fraction of the melting temperature). Still further, infiltration is more robust when conducted under vacuum as opposed to inert gas atmosphere such as argon.

Accordingly, with these parameters in mind, it is possible to design an infiltration setup whereby a first porous mass to be infiltrated is supported by a porous mass which differs in at least one respect with regard to that which is to be infiltrated, and the liquid infiltrant can be caused to infiltrate the first mass but not the supporting mass.

It is well known that a porous mass containing silicon carbide, for example, is infiltratable by molten silicon to produce a composite body. In the absence of free carbon, however, silicon carbide is reliably infiltrated by silicon (e.g., "siliconizing") only at temperatures well above the melting point of silicon. As the processing temperature is decreased to just slightly above the silicon melting point, infiltration becomes rather difficult, e.g., it may become slow and/or unreliable. If a metal like aluminum is alloyed with the silicon, the melting point or liquidus temperature of the resulting alloy is depressed. Thus, the processing temperature for making SiC composites can similarly be decreased while keeping the infiltrant entirely molten. More importantly, at the reduced processing temperatures, the distinction or discrimination between porous masses of SiC containing free carbon and those that do not becomes even greater. Under these conditions, then, a porous mass of SiC, perhaps even the same grade of SiC, can be used as both the preform to be infiltrated and the support or foundation material that halts further infiltration, again, depending on whether or not the mass of SiC also contains free carbon. One can take advantage of this infiltration characteristic in situations, for example, where impurities or contamination are an issue (e.g., semiconductor applications), the same source of silicon carbide can be used as a foundation material as is used as a porous mass to be infiltrated without exposing the resulting silicon carbide composite body to additional contaminants.

When the free carbon in the porous mass or preform to be infiltrated is interconnected instead of existing solely as discrete, isolated bodies, the infiltration of silicon-containing metal into the mass generally increases in reliability and robustness. Such a reticulated structure within a preform may result when carbon is added to a porous mass as a resin and the resin is subsequently pyrolyzed. Thus, it is possible to support a porous mass containing silicon carbide plus elemental carbon on a foundation of silicon carbide particulate not containing such free carbon, and infiltrate only the porous mass with silicon-containing infiltrant material. Further, because a silicon-aluminum alloy is capable of discriminating between porous masses containing free carbon in discrete versus interconnected form, conditions may be found (e.g., temperature) whereby such a metal can infiltrate the mass containing the reticulated carbon, but not the mass containing discrete particles of free carbon.

It seems that graphite has been the traditional material of choice for housing the molten infiltrant and preform. In view of the above finding, these graphite containers now can be isolated from direct contact with the molten infiltrant by instead arranging for this indirect support by the non-infiltratable foundation material. This result is significant because it dispenses with the need for graphite structures such as molds or "boats" to directly support the infiltrant material or the preform or porous mass to be infiltrated. Not only are such large graphite containers expensive, but also the silicon-containing infiltrant has a tendency to react with and bond to the graphite, making separation and recovery of the infiltrated body difficult. The graphite containers in particular are frequently damaged or even destroyed. Additionally, such separation and recovery efforts often result in damage to the composite body, which can be relatively brittle without the toughening effects of a non-silicon metal phase. While it is possible to apply a protective coating of, for example, boron nitride to the graphite container or to the preform surface in contact therewith to prevent or minimize the bonding effect, some end uses for the formed body, such as certain semiconductor applications, cannot tolerate the potential for the presence of boron. Moreover, the boron nitride coatings are not robust infiltrant blockers, especially at the higher infiltration temperatures, and often a small breach in the coating allows the infiltrant to infiltrate and react with a large zone of the underlying graphite material. Thus, the present invention permits the graphite containers to be used to support the foundation material, which in turn supports the porous mass to be infiltrated, and/or the infiltrant material, etc. This advance in the art permits these graphite structures to be reused in many more subsequent infiltration runs than they could be used previously. It may be possible even to use a different refractory material that is cheaper than graphite for the housing or container material.

It has been noted that silicon undergoes a net volume expansion of about 9 percent upon solidification. Thus, in accordance with another important aspect of the present invention, by alloying the silicon with a constituent such as a metal that undergoes a net volume shrinkage upon solidification, it is possible to produce a composite body whose residual infiltrant material within the composite body undergoes substantially no net volume change upon solidification. Thus, the production of silicon carbide composite bodies that exhibit neither solidification porosity nor solidification exuding of metal phase can be realized.

The particularly preferred alloying element of aluminum by itself exhibits a solidification shrinkage of some 6.6 percent by volume. Under the preferred conditions of a vacuum environment and a silicon carbide porous mass containing interconnected free carbon, infiltration can be achieved using infiltrants ranging from about 10 percent by weight silicon up to substantially 100 percent silicon. Accordingly, the residual infiltrant component of the formed silicon carbide body may range from nearly 100 percent aluminum to substantially 100 percent silicon. Thus, the volumetric change of the residual infiltrant material upon solidification can be tailored with infinite variability between about negative 6.6 percent (for pure aluminum) and about positive 9 percent. Although it is advantageous to reduce solidification shrinkage, say for example to negative 2 or negative 1 percent, it is highly desirable and highly advantageous to reduce solidification swelling from positive 9 percent to perhaps positive 7, positive 5 or positive 3 percent, or less.

Even if a silicon-metal infiltrant composition is used that exhibits overall net solidification shrinkage, with thoughtful lay-up design of the assemblage of preform, infiltrant material and support material, the solidification porosity that often results from this shrinkage largely can be avoided. For example, one could provide infiltrant material in excess of the minimum needed to fully infiltrate the preform, in other words, a "reservoir" of infiltrant supplying the mass to be infiltrated. The assemblage is then designed such that the last region to freeze in the composite body is supplied with molten infiltrant material from outside the body. In this way, any solidification porosity occurs outside of the composite body. Sometimes directional solidification of the composite body is employed to accomplish this desired result.

The opposite problem actually is more frequently encountered where silicon infiltrations are concerned: where the infiltrant expands upon solidification, and the composite body cannot hold the extra volume of material. The composite body thus exudes the (now) excess infiltrant. The exuded silicon may manifest itself as droplets or beads on the surface of the composite body, and often strongly bonded thereto. This nuisance material may have to be removed by grinding or grit blasting, with the concomitant risk of damaging the attached composite body. Also, it would be desirable to not have to undertake this extra manufacturing step.

An even more serious consequence of the solidification swelling of the silicon constituent is possible swelling of the entire composite structure, thereby complicating efforts to produce net-shape parts. Still worse is the risk that such solidification swelling will cause cracking of the composite body, a risk which increases as the size of the composite body increases.

Thus, the ability to reduce or even eliminate this solidification expansion of the silicon constituent of the infiltrant material by alloying or mixing the silicon with a material that shrinks upon solidification represents an important advance in the field of silicon-containing composite materials. Not only may such composite bodies be made more dimensionally accurate in the as-infiltrated condition, but may be produced without requiring an extra process step to remove the exuded silicon.

Whereas previously producers of silicon infiltrated composite materials were resigned to having to perform grinding or machining post-infiltration, the new reality is that such final grinding/machining can be greatly minimized, even eliminated in some cases. Thus, this operation, to the extent that it needs to be performed at all, can now be performed before silicon infiltration, when the porous mass is still in the preform stage. This "green machining" is considerably easier and faster than grinding or machining a dense composite body. However, the present inventors recognize that in order to obtain precision and fine detail at this stage, the size of the bodies making up the reinforcement component of the preform may need to be limited. This is because, unlike final grinding/machining, green machining tends to remove the bodies in their entirety, rather than remove portions of them. In other words, the limit of machining detail at the preform stage is limited by the surface finish that can be imparted to the preform, which in turn is controlled by the size of the bodies making up the preform. The present inventors have found it desirable that substantially all preform reinforcements, e.g., particulates, flakes, etc., be less than about 200 microns in size, and preferably at least 90 percent by volume be smaller than about 100 microns, and even more preferred that at least 90 volume percent be smaller than about 50 microns in size. For instance, the preform that was green machined in Example 5 featured particulate whose median size was about 13 microns.

Additionally, larger bodies may now be produced with less risk of cracking due to expansion of the silicon phase within the composite during cooling through its solidification temperature. In fact, the application and practice of the techniques discussed herein permit large, unitary (single piece) RBSC composite bodies to be manufactured with minimal final grinding or machining required to achieve net shape. For example, bases for semiconductor lithography machines that are larger than one meter in their longest dimension (specifically, about 1.3 by about 0.75 by about 0.3 meter) and having a mass in excess of 250 kg have been produced.

The ability of silicon infiltration technologies, or more particularly, the discovery of processing parameters pertaining to silicon infiltration technology that permit the fabrication of large structures of complex shape provides guidance in the selection of a preforming technique that can best take advantage of this potential. Specifically, fulfilling the potential of silicon infiltration technology tends to drive the preforming selection process away from preforming techniques such as dry pressing or injection molding, which are good for high volume production, but generally only of relatively small parts, in part because the pressing or injection pressures that are needed tend to be high. A complex shape requirement then tends to drive the preform processing away from techniques such as tape casting or extrusion, as these tend to used for making preforms that are flat or sheet-like, or of uniform cross-section, respectively. A requirement for relatively high loading of the preform, e.g., filler or reinforcement material, tends to drive the preform processing away from techniques such as compression molding. This technique may be thought of as a low-pressure form of dry pressing, and as with dry pressing, it is not generally conducive to high loading.

Among the preform processing techniques remaining are slip casting, sedimentation casting and thixotropic casting, and their variations. Slip casting requires plaster or otherwise porous molds, which must be dried before re-use, which takes time. Thus, slip casting is difficult to use in high volume production. Slip casting also requires the use of a stable slip, so there are limits on how large the particles are that one can use before it becomes impossible to keep them suspended in the liquid. This in turn limits the particle loading that can be achieved.

Thus, one can consider thixotropic casting and sedimentation casting. Thixotropic casting has been around for several decades but is still not that well known. Some consider it a version of slip casting. Like slip casting, the particles should be deflocculated. Unlike slip casting, however, the amount of colloidal sized particles should be kept low in thixotropic casting; otherwise it can be difficult to "break" the thixotropy and achieve a fluid condition. Another difference is that in thixotropic casting, the particles used can be quite coarse. Very little liquid is used; the powder seems merely to be damp. However, it exhibits extreme thixotropy, and will flow under applied vibration. Thus, the damp powder is placed into a mold, which may be porous or not, and the mold and its contents are subjected to vibration. The powder shows slurry-like behavior and flows and fills the mold. Very little liquid remains to mop up. When vibration is ceased, the slurry becomes so viscous due to its very high solids loading that it ceases flowing. A binder is often employed, but only a small quantity is usually needed. The very high solids loading can be achieved, for example, by employing an Andreasen particle size distribution.

Thixotropic casting, however, can leave large defects such as large pores in the preform. These can be cause by the formation of air bubbles in the slurry, which can be difficult to remove, or prevent forming, even with appropriate defloccu-lants and wetting agents. When carried out correctly, sedimentation casting can obviate such problems with large defects. Like thixotropic casting, sedimentation casting has been around for decades, but it is little known and not much used. In sedimentation casting, a slurry of particles in a liquid is poured into a nonporous mold. Unlike a slip, the particles are not maintained in suspension, typically because they are too large or too dense. Thus, they settle out of suspension, leaving predominantly liquid (typically aqueous solution) at the top of the mold, and a sediment of the particles throughout the rest of the mold. Optional vibration of the mold and its contents helps the particles fill out the mold space, and helps smaller particles nestle between larger particles to maximize packing density. The liquid may be removed periodically over the course of settling, and additional slurry may be added as needed to fill up the mold. Although particle size and/or density gradients may be desirable in some applications, usually what is wanted is a preform that is as homogeneous as possible. Since the settling particles are subject to Stokes' Law, particle segregation is a potential problem with sedimentation casting. However, if the slurry is highly loaded and not made too fluid, the particles will settle very little before they begin to pack. Thus, the segregation problem can be mitigated. When the particles have finished settling, the sediment is made rigid ("rigidified") to permit demolding and subsequent handling of a self-supporting preform. One such rigidifying technique is to freeze the mold and its contents. The sediment contains some residual liquid, and upon freezing, it holds the particles of the sediment together. Another rigidifying technique is to add a binder, or a substance that can operate as a binder, to the slurry. The binder may be soluble in the liquid. Upon drying the sediment in the mold, for example, by placing the mold and its contents in a drying oven, the binder comes out of solution and is activated, e.g., cross-linked, thereby providing binder qualities.

Both thixotropic casting and sedimentation casting can be extremely useful preforming tools used in conjunction with silicon infiltration processing for producing silicon composites of large, complex shape that are highly loaded in reinforcement. Thixotropic casting can use an even wider or larger particle size distribution than can sedimentation casting, since particle size segregation is hardly an issue. However, where defect size is an issue, for example, in achieving certain surface finish or certain mechanical strength targets, sedimentation casting may be preferred over thixotropic casting.

Figure 12:
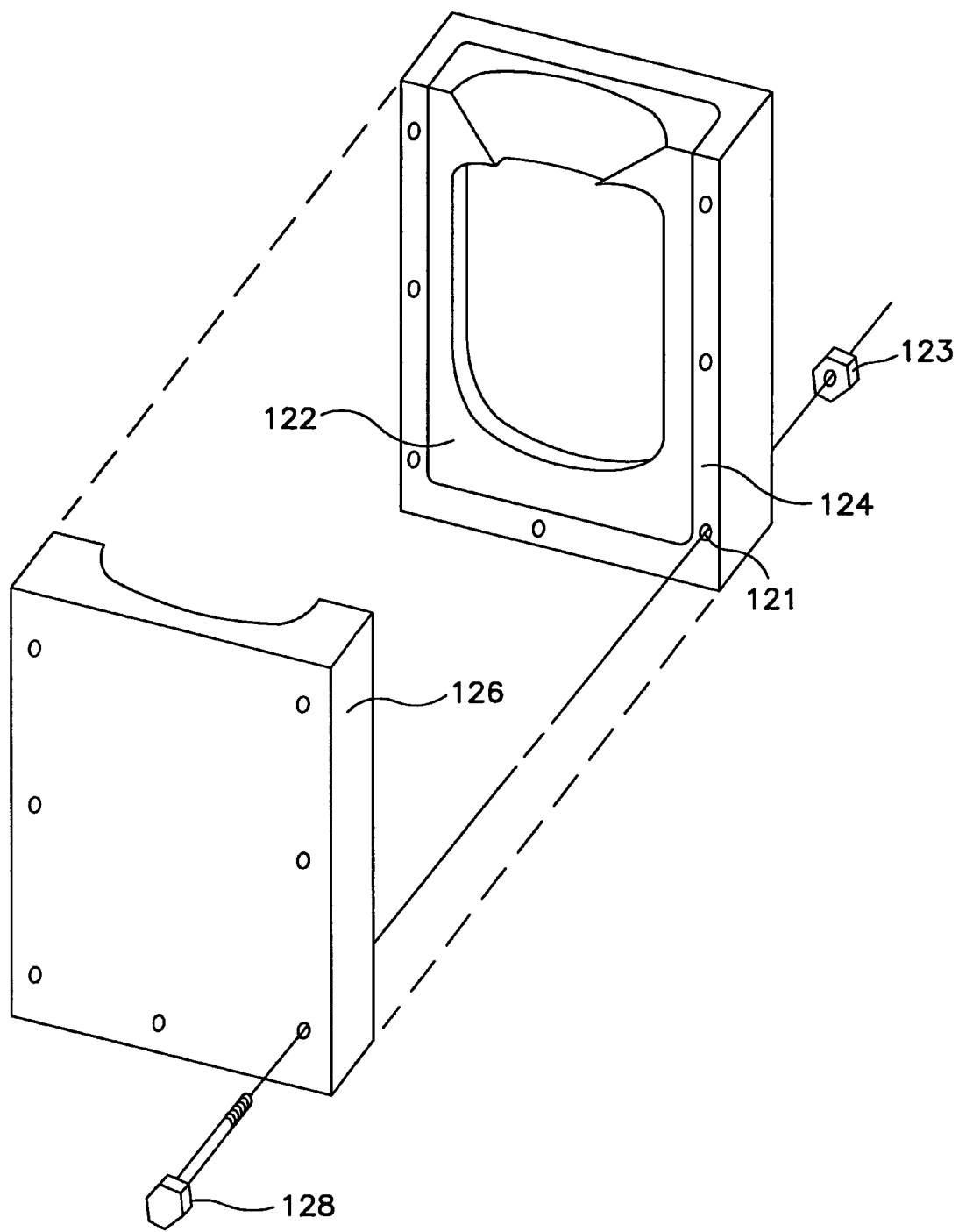
FIG. 12 shows a rubber-lined two-piece metal mold for sediment casting of preforms.

Non-porous molds for thixotropic or sedimentation casting should be chemically inert to the slurry constituents, relatively lightweight, readily cleanable, and sufficiently rigid to preserve the dimensional precision of the casting. Aluminum alloy meets these requirements. For complex shapes, the mold may need to be provided in two or more pieces that fit together and are held together. It can be difficult to achieve such a precision fit in aluminum, particularly after the wear and tear of repeated use in a production environment. Accordingly, a means for sealing the mold pieces, such as a gasket such as o-ring material, may be employed. A groove or channel in one or more mold pieces may be provided to house the gasket material. The mold pieces may be held together by any means known in the art-clamps, nuts & bolts or other similar fasteners, rubber bands, etc. In another embodiment, metal molds may not provide the casting shape, but instead are lined with rubber or other elastomeric, non-porous material, such as P-45 silicone rubber (Silicones, Inc, High Point, N.C.). This approach may lose something in precision of the shape, but it reduces weight, may assist in cleaning and re-use of the mold, and if the molding surface becomes damaged, it is less expensive to replace the rubber insert than the entire metal mold. It also obviates the need to perform precision machining of the metal to make the casting surfaces. A mold release agent such as Stoner E408 Dry Film Mold Release (Stoner, Inc., Quarryville, Pa.) may be spray coated on the casting surfaces to assist in demolding the cast preform. FIG. 12 shows a rubber-lined two-piece metal mold for casting of preforms to make small arms protective inserts, e.g., body armor. Here, the rubber lining 122 is shown on one half of the mold, and the means for holding the two mold halves 124, 126 together is by means of bolt 128 extending through hole 121 and fastened with nut 123.

At first glance, the embodiments discussed above for making improved silicon-containing composite structures such as RBSC may seem distinct and unrelated to each other. But they are, or can be, related. For instance, the need to produce large, unitary structures can be addressed in part by alloying the silicon infiltrant. It can also be addressed in part by minimizing the amount of chemical reaction that takes place during the infiltration process. In turn, this can be addressed by minimizing the amount of free carbon in the preform, which is also assisted by maximizing the reinforcement loading in the preform. And it is also assisted by minimizing the processing temperature, which in turn is assisted by alloying the silicon to produce a eutectic. Maximizing preform loading can be accomplished by using a molding technique such as sedimentation casting or thixotropic casting. Thus, there is a special relationship, almost a synergistic effect, between certain preforming techniques such as thixotropic or sedimentation casting, and the ability to achieve the potential shape-making capability of silicon infiltration processing.

The present invention will now be further described with reference to the following Examples and Comparative Examples.

Reference Example 1

No Alloying

This example demonstrates the production of a reaction bonded Si/SiC composite body. More specifically, this Example demonstrates the infiltration of substantially pure silicon into a silicon carbide preform containing an interconnected carbon phase derived from a resinous precursor.

First, a preform was prepared as follows. One hundred parts by weight of CRYSTOLON blocky (regular), green silicon carbide particulate (St. Gobain/Norton Industrial Ceramics, Worchester, Mass.) was combined with fifteen parts of Karo corn syrup (CPC International Inc., Englewood Cliffs, N.J.) by mixing. The silicon carbide particulate content consisted of about 70 percent having a median particle size of about 56 microns (Grade F 240), and the balance having a median particle size of about 13 microns (Grade F 500). The mixing was conducted in a Model RV02 Eirich high shear mixer as follows: First the SiC particulates were mixed for 2 minutes on the "low" speed. Then half the corn syrup was added and mixing continued on "low" for an additional 1 minute. Then mixing was interrupted to scrape the mixing bowl. Then the remaining half of the corn syrup was added and mixed for 1 minute on "low". After another interruption to scrape the bowl, mixing resumed on "low" for 2 additional minutes, then finished on the "high" speed for 1 minute.

The admixture was pushed through a 16 mesh screen (average opening size of about 1180 microns) to break up agglomerates.

Next, coupons measuring about 51 mm square by about 10 mm thick were uniaxially pressed in a steel die under an applied pressure of about 28 MPa.

The preform comprising the SiC particulate and the corn syrup was ejected from the die and placed into a controlled atmosphere furnace. In an atmosphere of flowing commercially pure nitrogen, the preform was heated to a temperature of about 800° C. at a rate of about 100 C per hour. After maintaining this temperature for about 2 hours, the corn syrup had been substantially completely pyrolyzed to carbon. The furnace and its contents were cooled at a rate of about 200° C. per hour. After cooling back substantially to ambient temperature, the preform was recovered from the furnace and calculated (based upon bulk density measurements) as having a volumetric loading of about 61 percent of theoretical. Carbon analysis via oxidation, performed on a similar sample, showed the presence of about 2.5 percent by weight of free carbon in the preform. Thus, this preform exhibited a SiC loading of about 59 percent.

Next, a lay-up to confine the infiltration process was prepared. Specifically, the interior surfaces of a Grade ATJ graphite housing (Union Carbide Corp., Carbon Products Div., Cleveland, Ohio) measuring about 375 mm by about 298 mm by about 51 mm deep was coated with a boron nitride slurry or paint at a rate or thickness of about 3.1 mg per square centimeter. The boron nitride paint was prepared by mixing four parts by weight of LUBRICOAT boron nitride paste (ZYP Coatings, Oak Ridge, Tenn.) with three parts water and spray coating using a Model 95 Binks spray gun.

The 46 gram preform was placed into the coated graphite housing. About 23 grams of silicon in lump form (Elkem Metals Co., Pittsburgh, Pa.) and comprising by weight about 0.5 percent Fe (max) and the balance Si, was placed on top of the preform. The top of the housing was covered with a loose-fitting (non-hermetic) BN coated graphite lid.

The completed lay-up was then placed into a vacuum furnace at about ambient temperature (e.g., about 20° C.). The air was evacuated using a mechanical roughing pump, and a rough vacuum of about 25 millitorr residual pressure was thereafter maintained. The lay-up was then heated from ambient temperature to a temperature of about 1350° C. at a rate of about 200° C. per hour. After maintaining a temperature of about 1350° C. for about 1 hour, the temperature was further increased to a temperature of about 1550° C. at a rate of about 200° C. per hour. After maintaining a temperature of about 1550° C. for about 1 hour, the temperature was decreased to a temperature of about 1450° C. at a rate of about 100° C. per hour. Without holding at this temperature, the lay-up temperature was further decreased to a temperature of about 1300° C. at a rate of about 25° C. per hour, which was immediately followed by a cooling at a rate of about 200° C. per hour to approximately ambient temperature.

The furnace atmosphere was brought back to ambient pressure and the lay-up was removed from the furnace. Disassembly of the lay-up revealed that silicon had fully infiltrated the preform to form a composite body comprising silicon carbide and silicon. After sandblasting off the residual silicon at the surface where infiltration commenced, a density of the composite body of about 2.89 g/cc was measured by the water immersion technique. Using the theoretical densities of SiC and Si, the body was calculated as being about 64 percent by volume of SiC and 36 percent Si. Of this 64 vol % SiC, about 5 vol % represents SiC that was produced in-situ (64%-59%).

Example 2

The technique of Example 1 was repeated, with a major change being that the infiltrant featured aluminum substituted for about half of the mass of silicon. Thus, excluding impurities, the infiltrant was about 50 percent by weight silicon and about 50 percent aluminum. Also, in this Example the infiltration was conducted at a lower temperature than in Example 1.

The masses of the preform and infiltrant were slightly different from those of Example 1, at 44.8 grams and 20 grams, respectively. As for the differences in the heating schedule, the lay-up of the present Example was heated in vacuo from about ambient temperature to a temperature of about 1000° C. at a rate of about 200° C. per hour. After maintaining a temperature of about 1000° C. for about 1 hour, the temperature was further increased to a temperature of about 1150° C. at a rate of about 150° C. per hour. After maintaining a temperature of about 1150° C. for about 4 hours, the lay-up was cooled to near-ambient temperature at a rate of about 200° C. per hour.

Disassembly of the lay-up revealed that the infiltrant had again fully infiltrated the preform to form a composite body. Significantly, there was no excess infiltrant oozing out of the surface of the formed body. The density of the composite body was again about 2.89 g/cc. The composition of this body was about 59 vol % SiC reinforcement, about 5 vol % in-situ SiC and about 36 vol % metal.

Example 3

This example demonstrates the effect of infiltrant chemistry on some selected physical properties of a silicon carbide composite body.

Two identical preforms were made using the materials and procedures similar to those detailed in Example 1. Following pyrolysis, each preform comprised by volume about 70 percent SiC and by weight about 3 percent elemental carbon.

One of the preforms, Sample A, was infiltrated according to the infiltrant composition and thermal processing schedule detailed in Example 1. The other preform, Sample B, was infiltrated according to the infiltrant composition and thermal processing schedule described in Example 2. Thus, Sample A was infiltrated with nominally pure silicon, and Sample B was infiltrated with nominally Si-50Al alloy. Following infiltration, the resulting SiC composite bodies were characterized. Selected properties are provided in Table I.

TABLE I

| Property | Test | Sample A | Sample B |
|---|---|---|---|
| SiC content (vol. %) | QIA | 73+/−3 | 76+/−2 |
| Density (g/cc) | Water Immersion | 2.97 | 3.01 |
| Young's Modulus (GPa) | Ultrasonic Pulse Echo | 347 | 302 |
| Poisson's Ratio | Ultrasonic Pulse Echo | 0.18 | 0.20 |
| Flexural Strength (MPa) | Four-Point Bend | 272+/−13 | 305+/−10 |
| Fracture Tough. (MPa-m$^{1/2}$) | Chevron Notch | 3.7+/−0.3 | 7.0+/−0.5 |
| CTE, 20-100 C (ppm/K) | TMA | 2.9 | 4.8 |
| Thermal Conduct. (W/m-K) | Photo Flash | 180 | 218 |

Example 4

This example demonstrates the fabrication of a silicon carbide composite "U channel" featuring a multi-constituent infiltrant phase.

Preforms were prepared by a sedimentation casting process. Specifically, about 25 parts of liquid were added to 100 parts of CRYSTOLON blocky (regular), green silicon carbide (St. Gobain/Norton Industrial Ceramics, Worchester, Mass.) and 8 to 12 parts of KRYSTAR 300 crystalline fructose (A.E. Staley Manufacturing Co., Decatur, Ill.) to make a slurry. The silicon carbide particulate consisted of about 70 parts by weight of Grade F 240 (median particle size of about 56 microns) and the balance Grade F 500 (median particle size of about 13 microns). The solids and liquids were added to a plastic jar and roll mixed for about 40 hours. The slurry was de-aired in about 760 mm of vacuum for about 5 minutes. About 15 minutes prior to casting, the slurry was re-roll mixed to suspend any settled particulates.

A graphite support plate was placed onto a vibration table. A rubber mold having a cavity of the desired shape to be cast was wetted with a surfactant consisting of a 10 weight percent aqueous solution of JOY dishwashing detergent (Proctor and Gamble, Cincinnati, Ohio). The wetted rubber mold was then placed onto the graphite plate and allowed to dry. The slurry was poured into the cavity. Vibration was commenced.

After the particulates had fully settled (about 3 hours), vibration was halted. The residual liquid on the top of the casting was blotted up with a sponge. The graphite plate and the castings in the rubber mold thereon were transferred from the vibration table to a freezer maintained at a temperature of about −15° C. The casting was thoroughly frozen in 6 hours time.

From the freezer, the frozen casting was demolded and placed onto a graphite setter tray for drying and bisque firing. The graphite tray and preform were then placed into a nitrogen atmosphere furnace at ambient temperature. The furnace was energized and programmed to heat to a temperature of about 40° C. over a period of about one-half hour, to hold at about 40° C. for about 2 hours, then to heat to a temperature of about 650° C. over a period of about 5 hours, to hold at about 650° C. for about 2 hours, then to cool down to about ambient temperature over a period of about 5 hours. The bisque fired preform was removed from the furnace and stored until the infiltration step. This firing operation pyrolyzes the fructose, yielding a well bonded preform containing about 2 to 3 percent by weight carbon.

The above-mentioned steps were employed to produce a "beam" preform and a "U-channel" preform. The U-channel preform had a mass of about 182 g and had overall dimensions of about 76 mm long by about 64 mm wide by about 38 mm high. This preform consisted of a flat base and two flat walls parallel to one another and at right angles with respect to the base. The base and walls were each about 10 mm thick. The beam preform was in the shape of a rectangular prism and measured about 89 mm long by about 11 mm wide by about 3 mm thick. During infiltration, this beam preform would serve as a conduit for conducting molten infiltrant toward and into the U-channel preform.

A lay-up for infiltration was then prepared.

Referring to FIGS. 4A and 4B, CRYSTOLON blocky, green silicon carbide particulate 11 having a median particle size of about 216 microns (Grade F 90, St. Gobain/Norton Industrial Ceramics, Worchester, Mass.) was poured into a graphite tray 13 measuring about 400 mm square by about 50 mm in height. This silicon carbide particulate foundation material was arranged within the graphite tray so as to be slightly higher in elevation out towards the wall of the tray than towards the center of the tray.

The U-channel preform (and specifically the base portion thereof) was placed into contact with the beam. More specifically, the U-channel preform was cemented to one end of the beam preform with a slurry comprising by weight about 67 percent CRYSTOLON regular green silicon carbide particulate (Grade F 500, St. Gobain/Norton Industrial Ceramics) having a median particle size of about 13 microns, and the balance being about equal weight fractions of water and KRYSTAR 300 fructose (A.E. Staley Manufacturing Co.). Following the pyrolysis cycle to carbonize the fructose, the bonded preforms were placed onto the SiC particulate bedding material with the U-channel preform 12 at the higher elevation, and the opposite end of the beam preform 15 extending down towards the lower elevations.

A number of fragments 17 of an infiltrant material comprising by weight about 68 percent silicon, balance substantially pure aluminum and having a total mass of about 62 g were arranged at the foot of the beam preform, at the lower elevation. Additional Grade F 90 SiC particulate was arranged in a ring 19 around the pile of infiltrant material 17 to help confine the latter once it was made molten. The graphite tray and its contents were then placed into a larger graphite container (e.g., a "boat") having a non-hermetically sealing graphite lid, thereby completing the lay-up.

The lay-up was placed into a vacuum furnace. The heating chamber was evacuated to a pressure below 100 millitorr with a mechanical roughing pump. The chamber and its contents were then heated from a temperature of about 40° C. to about 1100° C. over a period of about 5 hours, then held at about 1100° C. for about 1 hour, then heated to about 1270° C. in about 1 hour, then held at about 1270° C. for about 4 hours, then cooled to about 40° C. in about 6 hours.

Following this heating schedule, the boat and its contents was recovered from the vacuum furnace. The silicon-aluminum alloy had melted, infiltrated through the beam preform and into the U-channel preform to form a dense, silicon carbide composite body. Although the beam was bonded to the U-channel and had to be removed by cutting with a diamond saw, the infiltration of alloy into the preforms was well controlled. Specifically, there was no infiltration into the SiC particulate foundation material, nor was there exuding of excess alloy (as droplets or otherwise) from the surfaces of the infiltrated preforms.

Example 5

This example demonstrates the fabrication of a silicon carbide composite air bearing support frame featuring a multi-constituent infiltrant phase. This example also demonstrates the fabrication of a relatively large composite body.

An air bearing support frame preform was fabricated in two longitudinal sections using substantially the same sediment casting slurry as was described in Example 4. Following sedimentation casting and freezing, the preform halves were dried to a temperature of about 150 C, with a carefully controlled heating up to this temperature to avoid cracking the parts due to the potential for excessive water vapor generation. The preform halves were then additionally thermally processed in a nitrogen atmosphere substantially in accordance with the heating described in Example 4 to pyrolyze the fructose to carbon. The preforms could then be green machined.

After the green machining operation, the sections were cemented together with a slurry comprising by weight about 67 percent CRYSTOLON regular green silicon carbide particulate (Grade F 500, St. Gobain/Norton Industrial Ceramics) having a median particle size of about 13 microns, and the balance being about equal weight fractions of water and KRYSTAR 300 crystalline fructose (A.E. Staley Manufacturing Co.). This slurry was roll mixed for about 4 hours, then de-aired. The mating surfaces of the preform were spray coated with KRYLON lacquer (Borden, Inc., Columbus, Ohio) to retard the water absorption somewhat during the gluing operation. The slurry was applied to one of the surfaces and the halves of the preform were brought together under light pressure. The bonded preform was then put back into the 150 C drying oven to cure the fructose in the joint region. Following a small amount of additional green machining at the bond line, the air bearing preform had approximate dimensions of about 511 mm long by about 35 mm wide by about 70 mm in height, and had a mass of about 2145 g.

A lay-up was next prepared. Specifically, CRYSTOLON regular, green silicon carbide particulate (Grade F 90, St. Gobain/Norton Industrial Ceramics) having a median particle size of about 216 microns was poured into a graphite tray measuring about 790 mm long by about 230 mm wide by about 50 mm deep and leveled to form a foundation. The air bearing preform was placed on this foundation material. About 836 g of an infiltrant alloy comprising by weight about 68 percent silicon, balance substantially pure aluminum was placed nearby. The graphite tray was then placed into a larger graphite vessel having a non-hermetically sealing graphite lid to complete the lay-up.

This lay-up, which measured about 850 mm long by about 290 mm wide by about 240 mm high, was then placed into a vacuum furnace and thermally processed in substantially the same manner as that for Example 4, except that the temperature was maintained at about 1270° C. for about 6 hours instead of about 4 hours.

After removing the lay-up from the vacuum furnace following thermal processing, it was observed that the alloy infiltrant had melted, flowed across (but not into) the silicon carbide particulate foundation material into contact with the air bearing preform, and had infiltrated the preform to produce a silicon carbide composite air bearing support frame. While there was a body of residual alloy material bonded to the air bearing at the initial contact point, the other surfaces of the support frame accurately reflected the original preform surfaces, with no infiltrant material exuding from or otherwise accumulating on a surface.

Example 6

An air bearing support frame measuring about 120 mm square and about 19 mm in height was fabricated substantially along the lines described in Example 5 except that bonding of the two pieces was not carried out until after each piece had been infiltrated with silicon-aluminum alloy to form a reaction bonded silicon carbide composite part. FIG. 5 shows the more complex-shaped piece of the two in the as-infiltrated condition.

Examples 4 through 6 thus demonstrate that a shaped silicon carbide composite part, even one having a complex geometry, can be produced by the present reactive infiltration technique with the final composite body accurately replicating the shape and surfaces of the starting preform.

Comparative Example 1

The materials and techniques of Example 2 were substantially repeated, except that instead of adding corn syrup and pressing a preform, the porous mass consisted only of a loose mass of the silicon carbide particulates. While the Si-50Al alloy melted and covered the surface of the silicon carbide particulate, no infiltration occurred.

Comparative Example 2

Example 2 was substantially repeated, except that instead of adding about 15 percent by weight of corn syrup to the silicon carbide particulate reinforcement, about 1 percent by weight of ELVACITE acrylic resin (The DuPont Co., Wilmington, Del.) was added. About 99.1 percent of the resin was removed during the preform heating step prior to the infiltration step. Again, no infiltration occurred.

Comparative Example 3

Example 2 was substantially repeated, except that instead of adding 15 percent by weight of corn syrup to the silicon carbide particulate and pressing a preform, about 3 percent by weight of Grade KS-6 graphite powder (Lonza, Inc., Fairlawn, N.J.) was mixed into the particulates. While infiltration might have resulted at higher temperatures, no infiltration of Si-50Al alloy into a loose mass of this admixture occurred at the present operating temperature of about 1150° C.

Comparative Example 4

Example 1 was substantially repeated, except that instead of a vacuum environment, an atmosphere of commercially pure, flowing argon gas was used. No infiltration occurred.

Comparative Example 5

Example 2 was substantially repeated, except that instead of a vacuum environment, an atmosphere of commercially pure, flowing argon gas was used. Some regions of the preform were not infiltrated with alloy material. Moreover, those regions that were infiltrated were porous and non-uniform.

Example 7

This example demonstrates, among other important features of the present invention, the fabrication of a silicon carbide composite beam for a precision equipment application. In particular, the beam is used as a rigid, lightweight structural member in an x,y,z stage that may be employed for high precision location of electronic components for flat panel display or printed circuit board manufacturing, for example. The example also illustrates the building of a unitary, complex structure from the bonding of two smaller subunits.

Two beam halves, a bar whose cross-section was that of a "peanut", several infiltrant reservoir preforms, and the components of a support and feeder preform were each prepared by a sedimentation casting process. Specifically, about 24 parts of de-ionized water were added to 100 parts of CRYSTOLON green silicon carbide (Saint-Gobain/Norton Industrial Ceramics, Worcester, Mass.) and about 6 parts of KRYSTAR 300 crystalline fructose (A.E. Staley Manufacturing Co., Decatur, Ill.) to make a slurry. The silicon carbide particulate consisted of about 70 parts by weight of Grade F240 (median particle size of about 56 microns, blocky morphology) and the balance Grade 500 RG (median particle size of about 13 microns, rounded morphology). The solids and liquids were added to a plastic jar and roll mixed for about 48 hours. The slurry was de-aired in about 760 mm of vacuum for about 5 minutes. About 15 minutes prior to casting, the slurry was re-roll mixed to suspend any settled particulates.

A graphite support plate was placed onto a vibration table. A rubber mold having a cavity of the desired shape to be cast was wetted with a surfactant consisting of a 10 weight percent aqueous solution of JOY dishwashing detergent (Proctor and Gamble, Cincinnati, Ohio). The wetted rubber mold was then placed onto the graphite plate and the surfactant was allowed to dry. The slurry was poured into the cavity. Vibration was commenced.

After the particulates had fully settled (about 3 hours), vibration was halted. The residual liquid on the top of the casting was blotted up with a sponge. The graphite plate and the castings in the rubber mold thereon were transferred from the vibration table to a freezer maintained at a temperature of about minus 15° C.

Once the casting had frozen thoroughly, the rubber mold was removed from the freezer and the frozen sediment cast preforms contained therein were demolded and placed onto a graphite setter tray for drying and bisque firing. The drying operation specifically consisted of heating in an air atmosphere oven maintained at a temperature of about 160° C. until no more water was being evolved. For the bisque firing operation, the graphite trays and preforms were placed into a nitrogen atmosphere furnace at ambient temperature. The furnace was energized and programmed to heat to a temperature of about 90° C. at a rate of about 40° C. per hour, then to hold at about 90° C. for about 2 hours, then to further heat to a temperature of about 650° C. at a rate of about 100° C. per hour, to hold at about 650° C. for about 2 hours, then to cool down to about ambient temperature at a rate of about 200° C. per hour. This firing operation pyrolyzed the fructose, yielding a preform containing about 2 percent by weight carbon and bonded sufficiently to permit "green" machining.

Figure 6:
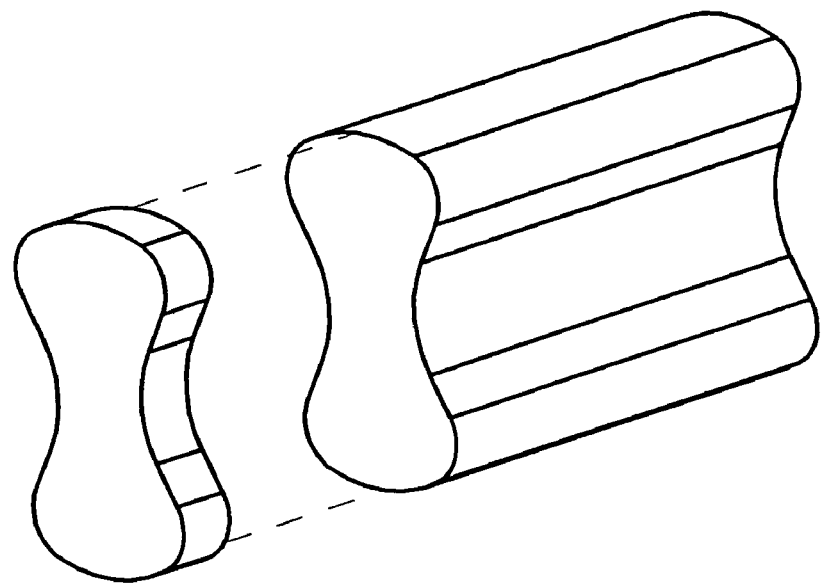
FIG. 6 is an isometric view of a section of a "key" or mechanical locking preform that has been sliced off of a piece of preform bar stock.

In general, diamond-plated or diamond-coated tools are used for this green machining of the porous preforms. Referring specifically to FIG. 6, the mechanical locking or "peanut" preforms were machined by slicing off approximately 5 mm thick sections from the preform bar using a commercially available band saw but featuring a diamond-coated blade.

Milling and drilling operations, particularly on the beam halves, were performed using a Model VF3 CNC machining center (Haas Automation Inc., Oxnard, Calif.) with mechanical fixturing (Machine Shop Supply Company, New Castle, Del.). As an example of a typical machining parameter, a one-inch (approx. 25 mm) diameter end mill operated at about 3500 rpm and traversing the workpiece at a rate of about 20 inches (510 mm) per minute has yielded satisfactory results.

After the preform machining operation, the preform subunits consisting of the two beam halves were fired again to remove volatiles not previously removed, and to strengthen the preform bodies. Specifically, the preform subunits were heated in vacuo to a temperature of about 800° C. at a rate of about 50° C. per hour, then further heated to a temperature of about 1575° C. at a rate of about 100° C. per hour, held at about 1575° C. for about 6 hours, and then cooled to substantially ambient temperature at a rate of about 100° C. per hour.

The preform subunits were then cemented together using the mechanical locking preforms. First, the subunits were fit together without cement to insure a good fit. The mating surfaces of each preform subunit were then coated with Ciba 8603 ResinFusion™ epoxy (Ciba Specialty Chemicals Corp., East Lansing, Mich.) consisting by weight of about 15 parts hardener to 100 parts resin. This epoxy coating acts as a sealer to retard the subsequent absorption of the filled epoxy adhesive into the subunits during the gluing operation. After curing the epoxy sealer overnight, the actual bonding adhesive was prepared. The bonding adhesive comprised by weight about 68 percent CRYSTOLON green silicon carbide particulate (St. Gobain/Norton Industrial Ceramics) and the balance being the Ciba 8603 ResinFusion™ epoxy system. The silicon carbide particulate featured the same grades and proportions as was used to prepare the preform subunits. This mixture was prepared simply by adding all of the constituents to a plastic beaker and stirring by hand until the mixture was uniform.

Even with a substantial fraction of solids in the form of the SiC particulate, the bonding adhesive was fairly fluid, and could be applied to each mating surface using an eyedropper. The halves of the preform were brought together under light pressure. The assembled preform assembly was then set aside overnight to cure the epoxy component of the adhesive.

Figure 7:
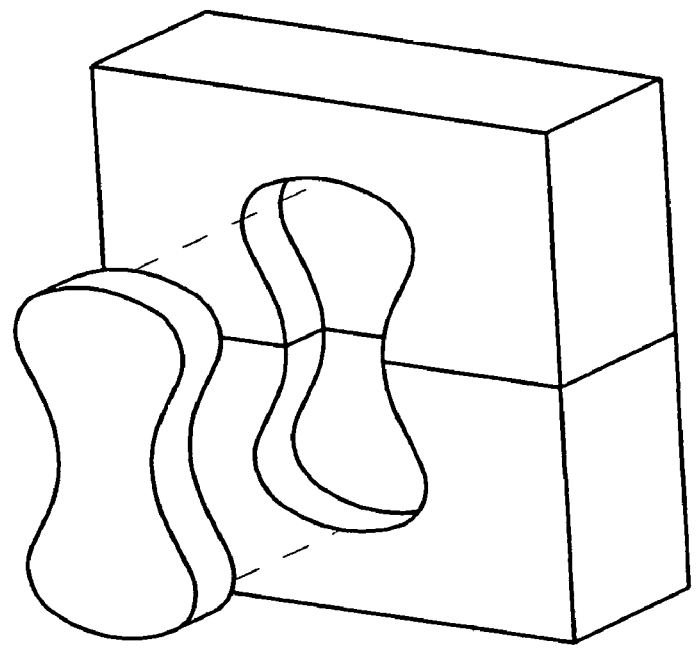
FIG. 7 is an isometric view showing how the mechanically locking preform is used to lock two preform subunits together.

The bonded subunits then had sufficient strength for handling for the mechanical locking operation. Referring to FIG. 7, the mechanical locking preform was placed against the bonded preform subunits across the bond line, and its outline was stenciled on the subunits. The interior of this outline was then milled out to a depth of about 5 mm. After checking the fit of the mechanical locking preform, the mating surfaces were sealed as described above, and then coated with the epoxy/particulate adhesive. The mechanical locking preform was then pressed into place, and the unit was cured overnight in the 150° C. drying oven. After sanding the bond line and exposed portion of the mechanical locking preform to insure flushness, the final green machining operation was conducted, consisting specifically of milling an approximately 25 mm diameter hole through the beam near one end. The mechanical locking preform adds strength to the assembled preform structure, which is useful in helping the structure endure the rigors of handling prior to infiltration, as well as the thermal stresses of heating to the infiltration temperature.

Following this final green machining operation, the epoxy-bonded beam preform had approximate dimensions of about 787 mm long by about 100 mm wide by about 50 mm in height, with a wall thickness of about 10 mm, and had a mass of about 4420 grams.

A lay-up for infiltration was then prepared.

Referring to FIGS. 8A and 8B, a Grade ATJ graphite tray 51 (Union Carbide Corp., Carbon Products Div., Cleveland, Ohio) measuring about 790 mm by about 230 mm by about 51 mm deep was placed into a larger graphite chamber 53 having interior dimensions of about 825 mm long by about 270 mm wide by about 320 mm in height.

CRYSTOLON blocky, green silicon carbide particulate 55 having a median particle size of about 216 microns (Grade F 90, St. Gobain/Norton Industrial Ceramics, Worcester, Mass.) was poured into the graphite tray to a depth of about 25 mm. This silicon carbide particulate loose foundation or support material was arranged within the graphite tray so as to be slightly higher in elevation out towards the wall of the tray than towards the center of the tray.

Infiltration of Support and Feeder Apparatus

Like the beam, the support and feeder apparatus for infiltrating the beam preform was fabricated in sections at the preform stage, then the preform sections or subunits were bonded together. Here, however, the sections were cemented together with a slurry comprising by weight about 67 percent CRYSTOLON green silicon carbide particulate (same grades and proportions as previously mentioned in this Example), and the balance being about equal weight fractions of water and KRYSTAR 300 crystalline fructose (A.E. Staley Manufacturing Co.). This slurry was roll mixed for about 4 hours, and then de-aired. The mating surfaces of the preform were spray coated with KRYLON lacquer (Borden, Inc., Columbus, Ohio) to retard the water absorption somewhat during the gluing operation. The slurry was applied to one of the surfaces and the halves of the preform were brought together under light pressure. The bonded preform was then put back into the 150° C. drying oven to cure the fructose in the joint region.

The support and infiltrant feeder apparatus preform was then positioned on top of the loose SiC particulate. A number of fragments 58 of a silicon alloy infiltrant material containing by weight about 32 percent aluminum, about 0.3 percent (max) of iron, and the balance consisting essentially of silicon were placed into a number of feeder reservoirs 56 each measuring about 133 mm long by about 64 mm wide by about 37 mm deep and being made of the same RBSC material as was intended to be formed in the support and feeder apparatus preform. The amount of silicon alloy infiltrant used was about 42 percent by weight of the mass of the support and feeder apparatus, plus an additional 10 percent to insure a slight excess of infiltrant. The reservoirs containing the infiltrant material were place in contact with the support apparatus by way of several small RBSC spacers 54. The RBSC nature of the reservoirs and spacers permits the controlled infiltration of the silicon alloy infiltrant material through the RBSC material and into the support and feeder preform to yield a RBSC support and feeder as a result. The top of the chamber was covered with a loose-fitting (non-hermetically sealing) graphite lid 52 featuring a number of approximately 1 cm diameter through-holes 50 to permit atmosphere exchange. The holes were covered with a piece of graphite felt which was held in place with a graphite block which served as a dead load, thereby completing the lay-up (not shown).

The lay-up was placed into a vacuum furnace. The heating chamber was evacuated to a pressure below 100 millitorr with a mechanical roughing pump, and a rough vacuum of less than about 100 millitorr residual pressure was thereafter maintained. The chamber and its contents were then heated from approximately ambient temperature to a temperature of about 800° C. at a rate of about 100° C. per hour, then held at about 800° C. for about 6 hours, then heated to about 1330° C. at a rate of about 100° C. per hour, then held at about 1330° C. for about 1 hours, then cooled to about 1200° C. at a rate of about 200° C. per hour, then held at about 1200° C. for about 6 hours, then finally cooled to about 20° C. at a rate of about 250° C. per hour.

Following this heating schedule, the chamber and its contents were recovered from the vacuum furnace. The silicon alloy infiltrant had melted and infiltrated through the RBSC feeder reservoirs and spacers into the support apparatus preform, thereby converting the carbon in the preform to silicon carbide, and thus forming a dense, silicon carbide support apparatus. Only light pressure was required to separate the RBSC support apparatus that had been fabricated from the RBSC feeder reservoirs and spacers. The RBSC feeder reservoirs and spacers, and the graphite tray and containment vessel were then recovered for re-use.

Infiltration of Beam Preform

The lay-up for infiltration of the beam preform was assembled mostly in the same way as for conducting the infiltration of the support and feeder preform. Referring still to FIGS. 8A and 8B, the beam preform 59 was placed atop the RBSC support and feeder apparatus 57. The reservoirs containing about 1860 grams of the infiltrant material (same composition as immediately above) were placed in contact with the beam preform and support apparatus by way of the several small RBSC spacers 54. The remainder of the lay-up was assembled in the same way as noted previously for infiltrating the support and feeder preform. The thermal processing was also substantially the same.

Following thermal processing, the chamber and its contents were recovered from the vacuum furnace. The silicon alloy infiltrant had melted and infiltrated through the RBSC feeder reservoirs and support apparatus into the beam preform, thereby converting the carbon in the preform to silicon carbide, and thus forming a dense, silicon carbide composite beam. Only light pressure was required to separate the RBSC beam that had been fabricated from the RBSC feeder reservoirs and support apparatus. The RBSC feeder reservoirs, spacers, support apparatus, the graphite tray and containment vessel were then recovered for re-use. This example also shows that a large unitary composite structure can be fabricated by assembling several smaller preform "subunits", and infiltrating the assembly.

Example 8

This example demonstrates the fabrication of a silicon carbide composite "cold plate" or pedestal for supporting the wafer chuck of a semiconductor lithography machine.

Slurry Preparation

Preforms were prepared by a sedimentation casting process. Specifically, a slurry mix consisting of about 20 parts by weight distilled water, about 8 parts of KRYSTAR 300 crystalline fructose (A.E. Staley Manufacturing Co., Decatur, Ill.) and the balance green silicon carbide particulate was prepared by adding the solids and liquids to a plastic jar and roll mixed for about 40 hours. The silicon carbide fraction consisted of about 70 parts Grade 240 HD (ESK GmbH, Kempten, Germany, distributed by MicroAbrasives Corp., Westfield, Mass.) having an average particle size of about 56 microns, and about 30 parts of Grade 500/600 RD (ESK) having a blend of 500 and 600 mesh particles (average size of about 13 and 9 microns, respectively) having a rounded morphology. The solids and liquids were added to a plastic jar and roll mixed for about 40 hours. The slurry was de-aired in about 760 mm of vacuum for about 5 minutes. About 15 minutes prior to casting, the slurry was re-roll mixed to suspend any settled particulates.

Preform Fabrication

Figure 9:
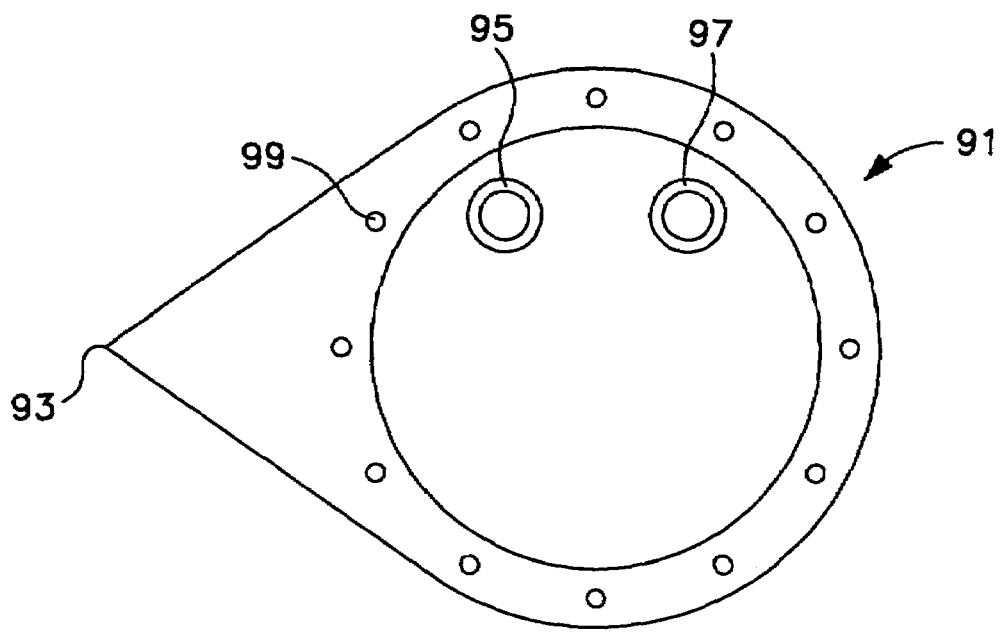
FIG. 9 is a bottom view of the cold plate described in Example 8.

Due to the complexity of the cold plate shape, this preform was fabricated in three sections, with the sections being adhesively bonded together following the drying/carbonizing procedure, to be discussed below. Further, a "feeder" preform, generally having a "U" shaped cross-section, was also fabricated to help "feed" molten infiltrant into the plate preform during the infiltration process, to be described in more detail to follow. The feeder preform is not part of the final "article of commerce". Referring to FIG. 9, the cold plate 91 resembles a disc, with one side of the disc being extended to a point 93. The faces of the plate are essentially parallel, and pair of tubes 95, 97 extend from the bottom face, the cavities of the tubes communicating with cooling passages within the body of the cold plate. Bolt holes 99 are provided around the circumference. The sections or subunits were taken parallel to the faces. Each section as well as the "feeder" preform was molded as follows.

A graphite support plate was placed onto a vibration table. A rubber mold having a cavity of the desired shape to be cast was wetted with a surfactant consisting of a 10 weight percent aqueous solution of JOY dishwashing detergent (Proctor and Gamble, Cincinnati, Ohio). The wetted rubber mold was then placed onto the graphite plate and allowed to dry. The slurry was poured into the cavity. Vibration was commenced.

After the particulates had fully settled (at least about 4 hours), vibration was halted. The residual liquid on the top of the casting was blotted up with a sponge. Shortly thereafter, the surface was dry to the touch. At that point, the graphite plate and the castings in the rubber mold thereon were transferred from the vibration table to a freezer maintained at a temperature of about −15° C. The casting was thoroughly frozen in about 12 hours time.

Drying/Carbonizing

From the freezer, the frozen casting was demolded and placed onto a graphite setter tray for a heating cycle that combing drying and bisque firing. The graphite tray and preform were then placed into a nitrogen atmosphere furnace at an initial temperature of about 40° C. After establishing a nitrogen flow rate of about 25 liters per minute, the furnace was energized and programmed to heat to a temperature of about 90° C. over a period of about 30 hours, to hold at about 90° C. for about 15 hours, then to heat to a temperature of about 110° C. over a period of about 20 hours, then to heat to a temperature of about 150° C. over a period of about 10 hours, to hold at about 150° C. for about 2 hours, then to heat to a temperature of about 650° C. over a period of about 10 hours, to hold at about 650° C. for about 4 hours, and then to cool down to a temperature of about 40° C. over a period of about 20 hours. The bisque: fired preform was removed from the furnace and stored until the infiltration step. This firing operation pyrolyzed the fructose, yielding a well-bonded preform containing about 2 to 3 percent by weight carbon.

Preform Bonding

Figure 10:
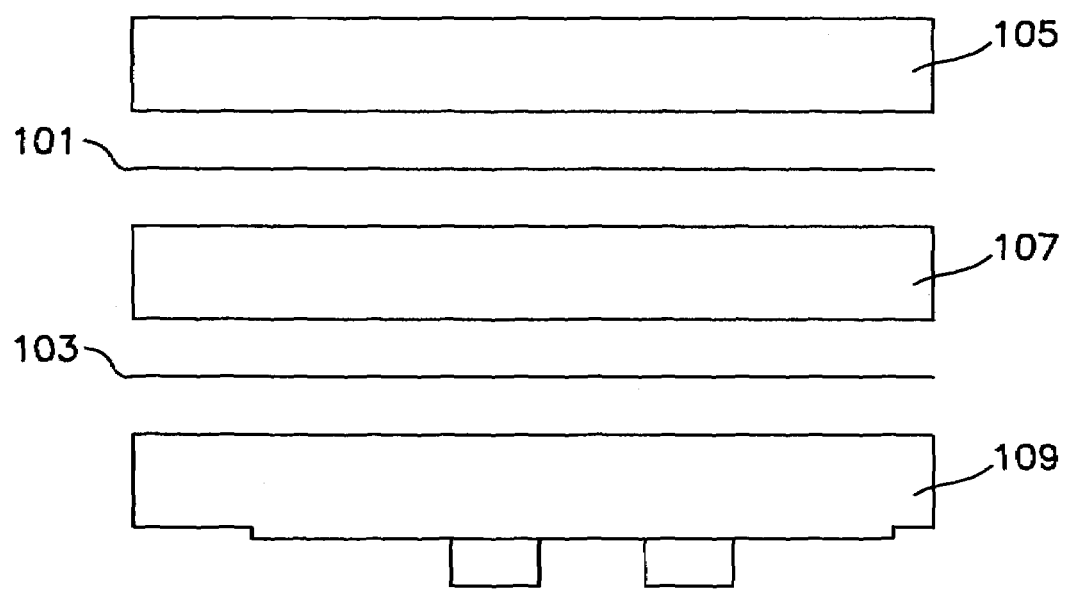
FIG. 10 is an exploded side view showing how the three layers or subunits of the cold plate are adhesively bonded together.

The three subunits of the cold plate preform were then adhesively bonded together. The adhesive used for this operation was a silicon carbide particulate filled cyanate ester resin, such as described in Commonly Owned U.S. Pat. No. 6,863,759. This composite adhesive was provided in sheet form and featured a particle loading of about 30-40 volume percent. Referring to FIG. 10, a sheet of adhesive 101, 103 was placed between each adjacent preform section to be bonded 105, 107, 109, and covering substantially the entire surface of the adjacent faces. The preform sections were placed onto a graphite tray and pressed together by a dead load of about 5 kg. This assembly was then heated in a drying oven at a temperature of about 120° C. for about 16 hours to cure the resin and bond the subunits to one another.

Green Machining

After removing the bonded cold plate preform from the drying oven and cooling to ambient temperature, the preform was then green machined to provide the necessary dimensions and features (e.g., holes, grooves, recesses, etc.) in the preform. The parameters and equipment specified in Example 7 were entirely satisfactory for this task.

Attachment of Feeder to Cold Plate Preform

The above-mentioned steps were employed to produce a "cold plate" preform and a "U-channel" preform. The U-channel preform had a mass of about 1.5 kg and consisted of a flat base and two flat walls parallel to one another and at right angles with respect to the base. The base and walls were each about 10 mm thick. This preform also featured a flat ledge or "foot" extending about 10 cm from one end, which would serve during the subsequent infiltration as a platform for supporting the pieces of infiltrant material. The cold plate preform was approximately in the shape of a disc measuring about 34 cm in diameter by about 3 cm thick. During infiltration, this U-channel preform would serve as a conduit or "feeder" for conducting molten infiltrant toward and into the cold plate preform. Thus, it is sometimes referred to as a "feeder" preform.

To provide more reliable contact between the feeder and the cold plate preforms during infiltration, the feeder and cold plate preforms were also adhesively bonded to one another. Specifically, the mating surfaces of each preform subunit were coated with Ciba 8603 ResinFusion™ epoxy (Ciba Specialty Chemicals Corp., East Lansing, Mich.) consisting by weight of about 15 parts hardener to 100 parts resin. This epoxy coating acts as a sealer to retard the subsequent absorption of the filled epoxy adhesive into the subunits during the gluing operation. After curing the epoxy sealer overnight, the actual bonding adhesive was prepared. The bonding adhesive comprised by weight about 65 percent powder and the balance being the Ciba 8603 ResinFusion™ epoxy system. The 65 percent that was powder consisted of about 1.5 percent by weight CABOSIL colloidal silica (Grade M-5, Cabot Corp., Tuscola, Ill.), about 20 percent 3 micron SiC (IMPCO, Port Washington, N.Y.), about 31.5 percent 500/600 rd. SiC (ESK) and the balance 240 grit CRYSTOLON green silicon carbide particulate (St. Gobain/Norton Industrial Ceramics, Worchester, Mass.) This mixture was prepared simply by adding all of the constituents to a plastic beaker and stirring by hand until the mixture was uniform.

Even with a substantial fraction of solids in the form of the SiC particulate, the bonding adhesive was fairly fluid, and could be applied to each mating surface using an eyedropper. The halves of the preform were brought together under light pressure. The assembled preform assembly was then set aside overnight to cure the epoxy component of the adhesive.

The final mass of the bonded assembly of feeder and cold plate preforms was about 6.7 kg.

A lay-up for infiltration was then prepared.

Infiltration

Figure 11A:
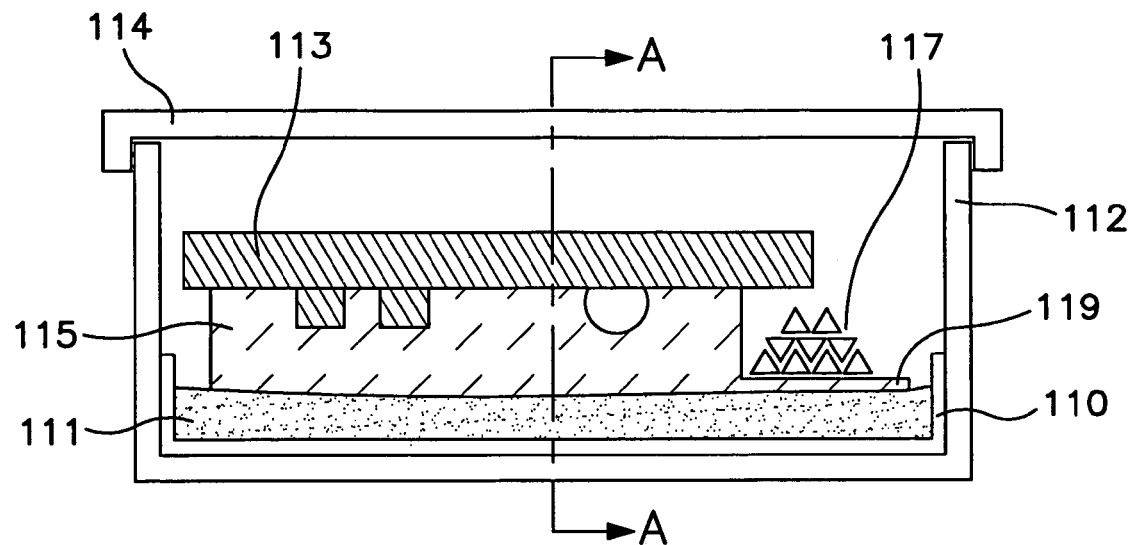
FIG. 11A is a left-hand side schematic view of an assembly used to fabricate a Si/Al/SiC cold plate.
Figure 11B:
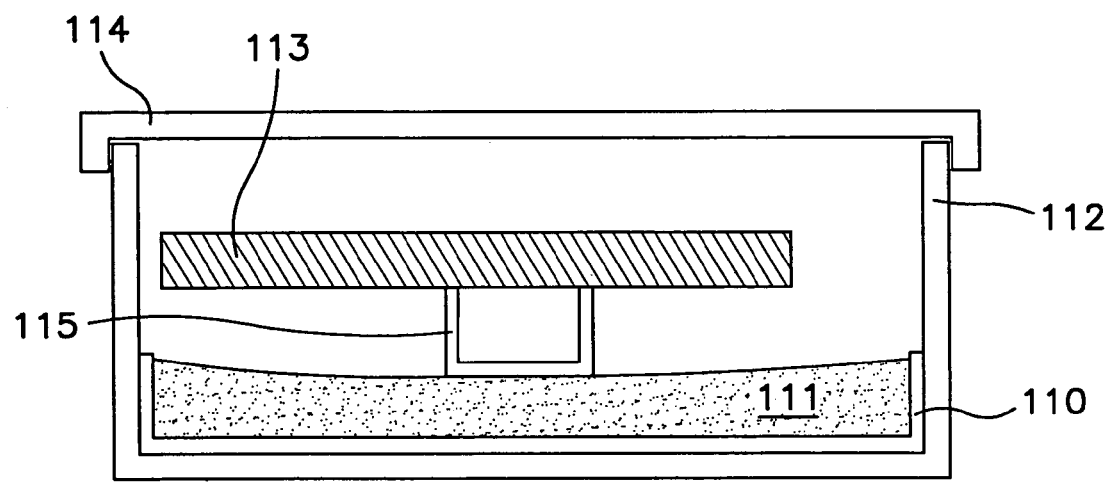
FIG. 11B is a schematic view of Section A-A of FIG. 11A.

Referring to FIGS. 11A and 11B, CRYSTOLON blocky, green silicon carbide particulate 111 having a median particle size of about 216 microns (Grade F 90, St. Gobain/Norton Industrial Ceramics, Worchester, Mass.) was poured into a graphite tray 110 measuring about 400 mm square by about 50 mm in height. This silicon carbide particulate foundation material was arranged within the graphite tray so as to be slightly higher in elevation out towards the wall of the tray than towards the center of the tray.

The assembly consisting of the green-machined cold plate preform 113 glued to the U-shaped feeder preform 115 was then placed on top of the foundation. A number of fragments of an infiltrant material 117 comprising by weight about 60 percent silicon, a maximum of about 0.3 percent iron (as an impurity), and the balance substantially pure aluminum and having a total mass of about 2.93 kg were placed at the foot 119 of the U-channel preform. The graphite tray and its contents were then placed into a larger graphite container 112 having a non-hermetically sealing graphite lid 114, thereby completing the lay-up.

The lay-up was placed into a vacuum furnace. The heating chamber was evacuated to a pressure below 100 millitorr with a mechanical roughing pump. The chamber and its contents were then heated from a temperature of about 40° C. to about 800° C. at a rate of about 50° C. per hour, then held at a temperature of about 800° C. for about 4 hours, then heating to a temperature of about 1350° C. at a rate of about 100° C. per hour, then held at about 1350° C. for about 2.5 hours, then cooled to a temperature of about 1250° C. at a rate of about 50° C. per hour, then held at about 1250° C. for about 4.5 hours, then cooled to a temperature of about 500° C. at a rate of about 200° C. per hour, then held at about 500° C. for about 2 hours, then further cooled to a temperature of about 30° C. at a rate of about 200° C. per hour.

Following this heating schedule, the container and its contents was recovered from the vacuum furnace. The silicon-aluminum alloy had melted, infiltrated through the U-channel feeder preform and into the cold plate preform to form a dense, silicon carbide composite body. The infiltrated U-channel feeder was then removed from the infiltrated cold plate through low force impacts. The resulting SiC composite cold plate then required only a small amount of machining, followed by cleaning and inspection to render it commercially marketable for its intended use.

The above two Examples thus demonstrate that a shaped silicon carbide composite part, even one having a complex geometry, can be produced by the present reactive infiltration technique, with the final composite body accurately replicating the shape and surfaces of the starting preform.

Example 9

The procedures of Example 8 were substantially repeated except that the slurry mix featured by weight about 21 percent distilled water and the 500/600 blend of green silicon carbide particulate was replaced with an equal amount of Grade 500 PO green silicon carbide particulate (about 13 microns average particle size).

Example 10

The procedures of Example 8 were substantially repeated except that the slurry mix composition was as follows: 23 weight percent distilled water, and 9 percent KRYSTAR 300 fructose. The green silicon carbide fraction consisted of 35 percent CRYSTOLON green silicon carbide particulate (Grade 500 reg., St. Gobain/Norton Industrial Ceramics, Worchester, Mass.) and 65 percent Grade 220 SiC (St. Gobain/Norton, average particle size of about 63 microns).

Example 11

In this Example, composite tiles or blocks were prepared having three different infiltrant compositions for the purpose of making and reporting selected physical properties. In particular, the preform composition and processing of Example 8 was utilized to produce a preform. The infiltrant composition was also the same. The amount of infiltrant metal used was about 0.45 times the amount of preform material, on a weight basis. For this simple shape, the design of the infiltration lay-up was similarly simple. It resembled that of Example 5, where the preform and infiltrant metal are placed on a foundation material consisting of silicon carbide particulate housed in a graphite container. Upon melting, the infiltrant material flows across the foundation a short distance to contact the preform, whereupon it infiltrates the preform to produce an Al/Si/SiC composite body, which is identified here as Sample C.

Similar blocks or tiles were prepared using aluminum-containing silicon alloys specifically containing about 30 and 20 weight percent aluminum, respectively, to produce Samples D and E, respectively. The iron impurity in these alloys was no more than about 0.5 weight percent.

Physical properties were measured using the techniques reported in Example 3, and they are reported in the table below for these three compositions.

INDUSTRIAL APPLICABILITY

The methods and compositions of the present invention find utility in applications requiring complex shapes, sometimes being large unitary complex structures, machining at an intermediate stage of development, high dimensional accuracy and precision, high specific stiffness, low thermal expansion coefficient, high hardness, high toughness, high thermal conductivity and/or high wear resistance. Accordingly, the silicon-containing composite materials of the present invention are of interest in the precision equipment, robotics, tooling, armor, automotive, electronic packaging and thermal management, and semiconductor fabrication industries, among others. The present silicon-containing composite materials are candidate materials for wear critical components. Specific articles of manufacture contemplated by the present invention include, but are not limited to, semiconductor wafer handling components such as wafer tables, vacuum chucks, electrostatic chucks, air bearing housings or support frames, electronic packages and substrates, machine tool bridges and bases, mirror substrates, mirror stages and flat panel display setters.

An artisan of ordinary skill will readily appreciate that various modifications may be made to what has been described herein without departing either from the scope or spirit of the present invention, and that what is intended to be covered by the patent laws of the United States is set forth in the claims appended hereto, and in appropriate equivalents thereof.

What is claimed is:
1. A composite body, comprising:
 a first component comprising infiltrant metal at least a portion of which is interconnected, said residual infiltrant metal comprising silicon metal in at least a plurality amount, and at least one other metallic constituent; and
 a second component comprising at least one reinforcement material distributed throughout said first component, said composite body furthermore containing essentially no reactable carbon or reaction product of such reactable

| Material Property | Test Temperature | Typical Properties Sample C | Typical Properties Sample D | Typical Properties Sample E |
| --- | --- | --- | --- | --- |
| Nominal SiC Content (vol. %) | — | 70 | 70 | 70 |
| Nominal Metal Content (vol. %) | — | 30 | 30 | 30 |
| Metal Composition (wt. ratio) | — | 60 Al-40 Si | 40 Al-60 Si | 25 Al-75 Si |
| Bulk Density-kg/m$^3$ (lb/in$^3$) | 21° C. (70° F.) | 3,020 (0.11) | 3,010 (0.11) | 3,000 (0.11) |
| Young's Modulus-GPa (Msi) | 21° C. (70° F.) | 305 (44) | 330 (47) | 340 (49) |
| Poisson's Ratio | 21° C. (70° F.) | 0.20 | 0.19 | 0.19 |
| Flexural Strength-MPa (ksi) | 21° C. (70° F.) | 280 (40) | 275 (39) | 270 (39) |
| Fracture Toughness MPa·m$^{1/2}$ (ksi·in$^{1/2}$) | 21° C. (70° F.) | 7.0 (6.4) | 6.5 (5.9) | 6.0 (5.5) |
| Coefficient of Thermal Expansion-ppm/° C. (ppm/° F.) | 21-100° C. (70-212° F.) | 4.8 (27) | 4.4 (2.5) | 3.8 (2.1) |
| Thermal Conductivity W/m·K (BTU/hr·ft·° F.) | 21° C. (70° F.) | 210 (121) | 200 (115) | 190 (110) | carbon with said infiltrant metal, wherein said infiltrant metal comprises by weight at least about 40 percent of said silicon.

2. A composite body, comprising:
(a) a first component comprising (i) silicon carbide and (ii) infiltrant metal at least a portion of which is interconnected, said infiltrant metal comprising silicon metal and at least one other metallic constituent; and
(b) a second component comprising at least 45 percent by volume of at least one reinforcement material distributed throughout said first component, said reinforcement material having a morphology other than fibrous, said reinforcement material comprising at least one material selected from the group consisting of carbides, nitrides, borides and oxides.

3. The composite body of claim 2, wherein said silicon carbide is the "beta" type.

4. The composite body of claim 2, wherein said silicon carbide phase is produced in-situ and makes up no more than about 24 percent by volume of said composite body.

* * * * *